US012663893B2

(12) United States Patent
Kim et al.

(10) Patent No.: US 12,663,893 B2
(45) Date of Patent: Jun. 23, 2026

(54) ELECTRONIC DEVICE INCLUDING SENSOR DRIVER CONFIGURED TO OPERATE IN MULTIPLE MODES

(71) Applicant: Samsung Display Co., Ltd., Yongin-si (KR)

(72) Inventors: Hyungbae Kim, Yongin-si (KR); Sanghyun Lim, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 19/017,359

(22) Filed: Jan. 10, 2025

(65) Prior Publication Data

US 2025/0258561 A1     Aug. 14, 2025

(30) Foreign Application Priority Data

Feb. 14, 2024     (KR) ........................ 10-2024-0021285
Jul. 26, 2024     (KR) ........................ 10-2024-0099435

(51) Int. Cl.
*G06F 3/041*     (2006.01)
*G06F 3/044*     (2006.01)

(52) U.S. Cl.
CPC ........ *G06F 3/04162* (2019.05); *G06F 3/0442* (2019.05); *G06F 3/0443* (2019.05); *G06F 2203/04106* (2013.01); *G06F 2203/04111* (2013.01); *G06F 2203/04112* (2013.01)

(58) Field of Classification Search
CPC ................................................ G06F 3/04162
See application file for complete search history.

(56) References Cited

U.S. PATENT DOCUMENTS

| 8,228,312 B2 | 7/2012 | Matsubara |
| 10,025,434 B2 | 7/2018 | Jang et al. |
| 11,099,677 B2 | 8/2021 | Lee et al. |

(Continued)

FOREIGN PATENT DOCUMENTS

| KR | 10-2015-0076774 A | 7/2015 |
| KR | 10-1581672 B1 | 12/2015 |

(Continued)

OTHER PUBLICATIONS

International Search Report dated Apr. 30, 2025, corresponding to PCT/KR2025/001430, 11 pages.

*Primary Examiner* — Chun-Nan Lin
(74) *Attorney, Agent, or Firm* — Womble Bond Dickinson (US) LLP

(57)     ABSTRACT

An electronic device includes: a display layer; a sensor layer; and a sensor driver to drive the sensor layer. The sensor layer includes: first electrodes, each extending in a first direction; second electrodes, each extending in a second direction; and auxiliary electrodes, each extending in the first direction, and insulated from the second electrodes. The sensor driver is to operate in a first mode for sensing a touch or in a second mode for sensing an external input device, and the second mode includes a charging mode and a sensing mode. In the first mode, the sensor driver is to electrically connect a first end and a second end to each other of each of the second electrodes, and transmit a driving signal to each of the second electrodes. In the sensing mode, the sensor driver is to receive a first sensing signal through the second end.

28 Claims, 29 Drawing Sheets

(56)　　　　　References Cited

U.S. PATENT DOCUMENTS

| | | | |
|---|---|---|---|
| 2017/0123569 A1 | 5/2017 | Kim et al. | |
| 2021/0157432 A1* | 5/2021 | Lee | G06F 3/04166 |
| 2023/0025817 A1* | 1/2023 | Choi | G06F 3/0443 |
| 2023/0236686 A1* | 7/2023 | Lee | G06F 3/0446 |
| | | | 345/174 |
| 2024/0094842 A1 | 3/2024 | Kim et al. | |

FOREIGN PATENT DOCUMENTS

| | | | |
|---|---|---|---|
| KR | 10-2016-0116743 A | 10/2016 | |
| KR | 10-2021-0062178 A | 5/2021 | |
| KR | 10-2023-0041449 A | 3/2023 | |
| KR | 10-2023-0114821 A | 8/2023 | |
| KR | 10-2023-0162906 A | 11/2023 | |
| KR | 10-2024-0006869 A | 1/2024 | |
| WO | 2023/068872 A1 | 4/2023 | |

* cited by examiner

ELECTRONIC DEVICE INCLUDING SENSOR DRIVER CONFIGURED TO OPERATE IN MULTIPLE MODES

CROSS-REFERENCE TO RELATED APPLICATIONS

The present application claims priority to and the benefit of Korean Patent Application Nos. 10-2024-0021285, filed on Feb. 14, 2024, and 10-2024-0099435, filed on Jul. 26, 2024, in the Korean Intellectual Property Office, the entire disclosures of all of which are incorporated by reference herein.

BACKGROUND

Aspects of embodiments of the present disclosure relate to an electronic device capable of sensing an input by a pen.

A multimedia electronic device, such as a television (TV), a mobile phone, a tablet computer, a laptop, a navigation system, or a game console, includes a display device for displaying an image. In addition to a general input device, such as a button, a keyboard, or a mouse, an electronic device may include a sensor layer (e.g., an input sensor) capable of providing a touch-based input manner that allows a user to enter information or a command easily and intuitively. The sensor layer may sense a user's touch or pressure. Recently, there is an increasing demand for using a pen for a finer touch input for users who are accustomed to entering information by using writing instruments, or for a specific application (e.g. an application program for sketching or drawing).

The above information disclosed in this Background section is for enhancement of understanding of the background of the present disclosure, and therefore, it may contain information that does not constitute prior art.

SUMMARY

One or more embodiments of the present disclosure may be directed to an electronic device capable of sensing an input by a pen.

According to one or more embodiments of the present disclosure, an electronic device includes: a display layer; a sensor layer on the display layer; and a sensor driver configured to drive the sensor layer. The sensor layer includes: a plurality of first electrodes, each extending in a first direction; a plurality of second electrodes, each extending in a second direction crossing the first direction; and a plurality of auxiliary electrodes, each extending in the first direction, and insulated from the plurality of second electrodes. The sensor driver is configured to operate in a first mode for sensing a touch or in a second mode for sensing an external input device, and the second mode includes a charging mode and a sensing mode. In the first mode, the sensor driver is configured to electrically connect a first end and a second end to each other of each of the plurality of second electrodes, and transmit a driving signal to each of the plurality of second electrodes. In the sensing mode, the sensor driver is configured to receive a first sensing signal through the second end.

In an embodiment, each of the plurality of auxiliary electrodes may include at least one pattern electrode, and in a plan view, each of the plurality of first electrodes may surround the pattern electrode of a corresponding one of the plurality of auxiliary electrodes.

In an embodiment, an area of each of the plurality of first electrodes may be smaller than an area of each of the plurality of second electrodes.

In an embodiment, in a plan view, a length of each of the plurality of first electrodes in the first direction may be smaller than a length of each of the plurality of second electrodes in the second direction.

In an embodiment, the plurality of auxiliary electrodes may be electrically connected to each other.

In an embodiment, the sensor driver may be configured to directly receive a current of the first sensing signal in the sensing mode, and the sensor driver may be configured to receive a second sensing signal transferred by a capacitive coupling between the plurality of first electrodes and the plurality of auxiliary electrodes in the sensing mode.

In an embodiment, an intensity of the first sensing signal may be greater than an intensity of the second sensing signal.

In an embodiment, the sensor driver may include: a driver configured to generate the driving signal and a charging signal; a sensing circuit including an analog front-end; a voltage providing circuit configured to provide a voltage with a voltage level; a first pad part electrically connected to the first end; a second pad part electrically connected to the second end; a first switch connected to the first pad part, and configured to switch between the voltage providing circuit and the second pad part; and a second switch connected to the second pad part, and configured to switch between the driver and the sensing circuit.

In an embodiment, the sensing circuit may be configured to operate in a single-ended mode.

In an embodiment, the sensing circuit may be configured to operate in a differential mode.

In an embodiment, in the first mode, the first switch may be configured to be connected to the first pad part and the second pad part, and the second switch may be configured to be connected to the second pad part and the driver.

In an embodiment, in the charging mode, the sensor driver may be configured to transmit a first charging signal to one of the plurality of auxiliary electrodes, and transmit a second charging signal to another of the plurality of auxiliary electrodes.

In an embodiment, a phase of the first charging signal may be opposite to a phase of the second charging signal.

In an embodiment, during the charging mode, the plurality of second electrodes may be configured to be floated.

In an embodiment, the one of the plurality of auxiliary electrodes and the another of the plurality of auxiliary electrodes may be spaced from each other with at least one of others of the plurality of auxiliary electrodes located therebetween.

In an embodiment, in the charging mode, the first switch may be configured to be connected to the first pad part and the voltage providing circuit, the second switch may be configured to be connected to the second pad part and the driver, a first charging signal may be configured to be transmitted to one of the plurality of second electrodes, and a second charging signal may be configured to be transmitted to another of the plurality of second electrodes.

In an embodiment, a phase of the first charging signal may be opposite to a phase of the second charging signal.

In an embodiment, the one of the plurality of second electrodes and the another of the plurality of second electrodes may be spaced from each other with at least one of others of the plurality of second electrodes located therebetween.

In an embodiment, the sensor layer may include an active area, and a peripheral area adjacent to the active area. The plurality of first electrodes, the plurality of second electrodes, and the plurality of auxiliary electrodes may be located in the active area. The sensor layer may further include a plurality of sensing lines located in the peripheral area, and connected to the plurality of second electrodes, respectively.

In an embodiment, in the charging mode, a first distance between the one of the plurality of second electrodes and the another of the plurality of second electrodes in a first direction may be greater than a second distance between one of the plurality of sensing lines connected to the one of the plurality of second electrodes and another of the plurality of sensing lines connected to the another of the plurality of second electrodes, in a second direction crossing the first direction.

According to one or more embodiments of the present disclosure, an electronic device includes: a display layer; a sensor layer on the display layer; and a sensor driver configured to drive the sensor layer. The sensor layer includes: a plurality of first electrodes, each extending in a first direction; a plurality of second electrodes, each extending in a second direction crossing the first direction; and a plurality of auxiliary electrodes, each extending in the first direction, and insulated from the plurality of second electrodes. The sensor driver is configured to operate in a charging mode or a sensing mode. In the charging mode, the sensor driver is configured to transmit a first charging signal to one of the plurality of auxiliary electrodes, and transmit a second charging signal to another of the plurality of auxiliary electrodes. In the sensing mode, the sensor driver is configured to directly receive a current of a first sensing signal from the plurality of second electrodes, and in the sensing mode, the sensor driver is configured to receive a second sensing signal transferred by a capacitive coupling between the plurality of first electrodes and the plurality of auxiliary electrodes.

In an embodiment, each of the plurality of auxiliary electrodes may include at least one pattern electrode, and in a plan view, each of the plurality of first electrodes may surround the pattern electrode of a corresponding one of the plurality of auxiliary electrodes.

In an embodiment, an area of each of the plurality of first electrodes may be smaller than an area of each of the plurality of second electrodes.

In an embodiment, in a plan view, a length of each of the plurality of first electrodes in the first direction may be smaller than a length of each of the plurality of second electrodes in the second direction.

In an embodiment, the plurality of auxiliary electrodes may be electrically connected to each other.

In an embodiment, an intensity of the first sensing signal may be greater than an intensity of the second sensing signal.

In an embodiment, a phase of the first charging signal may be opposite to a phase of the second charging signal.

In an embodiment, during the charging mode, the plurality of second electrodes may be configured to be floated.

However, the present disclosure is not limited to the above aspects and features, and the above and additional aspects and features will be set forth, in part, in the detailed description that follows with reference to the drawings, and in part, may be apparent therefrom, or may be learned by practicing one or more of the presented embodiments of the present disclosure.

BRIEF DESCRIPTION OF THE DRAWINGS

The above and other aspects and features of the present disclosure will be more clearly understood from the following detailed description of the illustrative, non-limiting embodiments with reference to the accompanying drawings.

DETAILED DESCRIPTION

Figure 1A:
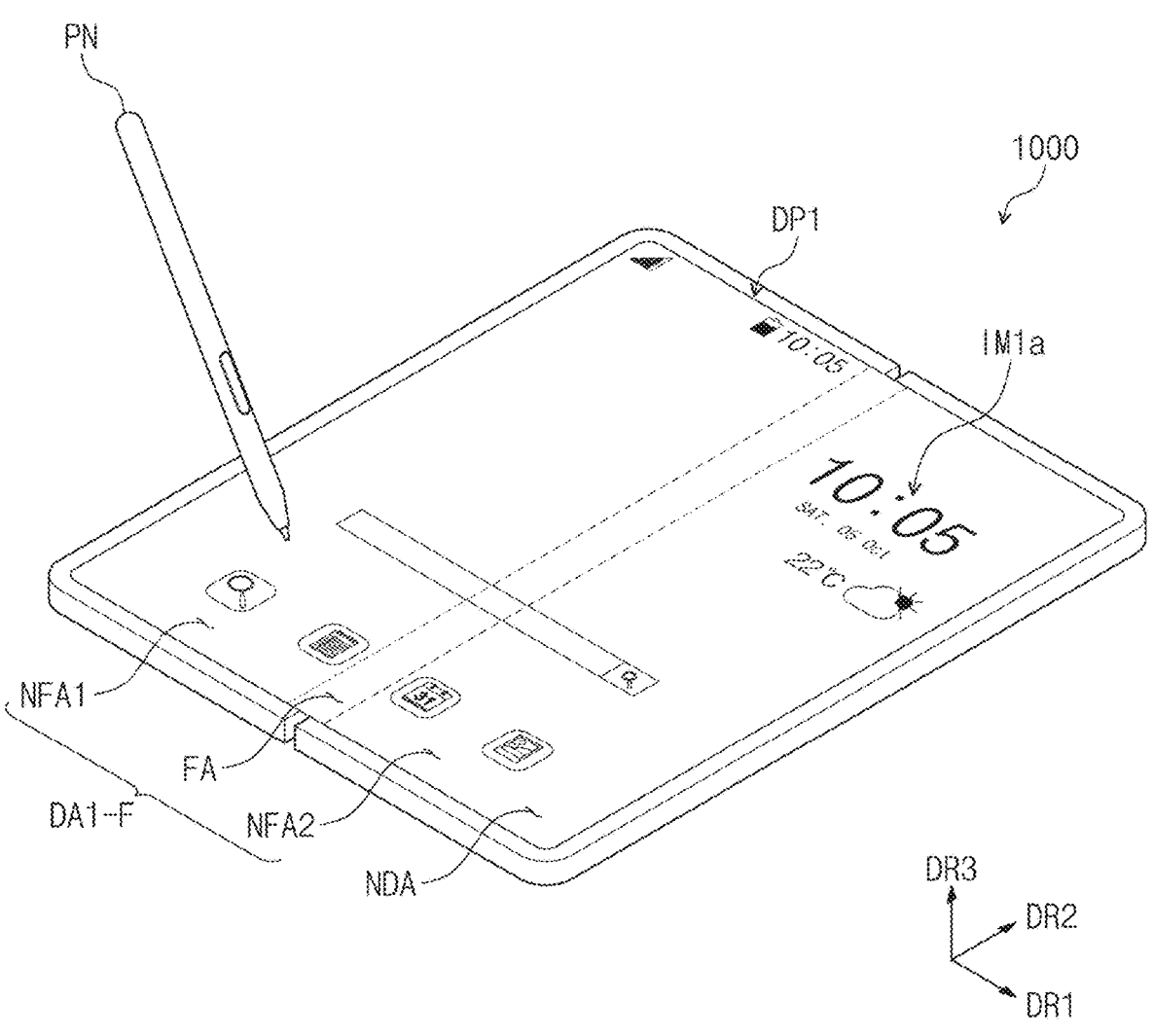
FIG. 1A is a perspective view of an electronic device according to an embodiment of the present disclosure.

Hereinafter, embodiments will be described in more detail with reference to the accompanying drawings, in which like reference numbers refer to like elements throughout. The present disclosure, however, may be embodied in various different forms, and should not be construed as being limited to only the illustrated embodiments herein. Rather, these embodiments are provided as examples so that this disclosure will be thorough and complete, and will fully convey the aspects and features of the present disclosure to those skilled in the art. Accordingly, processes, elements, and techniques that are not necessary to those having ordinary skill in the art for a complete understanding of the aspects and features of the present disclosure may not be described. Unless otherwise noted, like reference numerals denote like elements throughout the attached drawings and the written description, and thus, redundant description thereof may not be repeated.

When a certain embodiment may be implemented differently, a specific process order may be different from the described order. For example, two consecutively described processes may be performed at the same or substantially at the same time, or may be performed in an order opposite to the described order.

Further, as would be understood by a person having ordinary skill in the art, in view of the present disclosure in its entirety, each suitable feature of the various embodiments of the present disclosure may be combined or combined with each other, partially or entirely, and may be technically interlocked and operated in various suitable ways, and each embodiment may be implemented independently of each other or in conjunction with each other in any suitable manner, unless otherwise stated or implied.

In the drawings, the relative sizes, thicknesses, and ratios of elements, layers, and regions may be exaggerated and/or simplified for clarity. Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

Further, it should be expected that the shapes shown in the figures may vary in practice depending, for example, on tolerances and/or manufacturing techniques. Accordingly, the embodiments of the present disclosure should not be construed as being limited to the specific shapes shown in the figures, and should be construed considering changes in shapes that may occur, for example, as a result of manufacturing. As such, the shapes shown in the drawings may not depict the actual shapes of areas of the device, and the present disclosure is not limited thereto.

In the figures, the x-axis, the y-axis, and the z-axis are not limited to three axes of the rectangular coordinate system, and may be interpreted in a broader sense. For example, the x-axis, the y-axis, and the z-axis may be perpendicular to or substantially perpendicular to one another, or may represent different directions from each other that are not perpendicular to one another.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

It will be understood that when an element or layer is referred to as being "on," "connected to," or "coupled to" another element or layer, it can be directly on, connected to, or coupled to the other element or layer, or one or more intervening elements or layers may be present. Similarly, when a layer, an area, or an element is referred to as being "electrically connected" to another layer, area, or element, it may be directly electrically connected to the other layer, area, or element, and/or may be indirectly electrically connected with one or more intervening layers, areas, or elements therebetween. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments and is not intended to be limiting of the present disclosure. As used herein, the singular forms "a" and "an" are intended to include the plural forms as well, unless the context clearly indicates otherwise. It will be further understood that the terms "comprises," "comprising," "includes," "including," "has," "have," and "having," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. For example, the expression "A and/or B" denotes A, B, or A and B. Expressions such as "at least one of," when preceding a list of elements, modify the entire list of elements and do not modify the individual elements of the list. For example, the expression "at least one of a, b, or c," "at least one of a, b, and c," and "at least one selected from the group consisting of a, b, and c" indicates only a, only b, only c, both a and b, both a and c, both b and c, all of a, b, and c, or variations thereof.

As used herein, the term "substantially," "about," and similar terms are used as terms of approximation and not as terms of degree, and are intended to account for the inherent variations in measured or calculated values that would be recognized by those of ordinary skill in the art. Further, the use of "may" when describing embodiments of the present disclosure refers to "one or more embodiments of the present disclosure." As used herein, the terms "use," "using," and "used" may be considered synonymous with the terms "utilize," "utilizing," and "utilized," respectively.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Figure 1B:
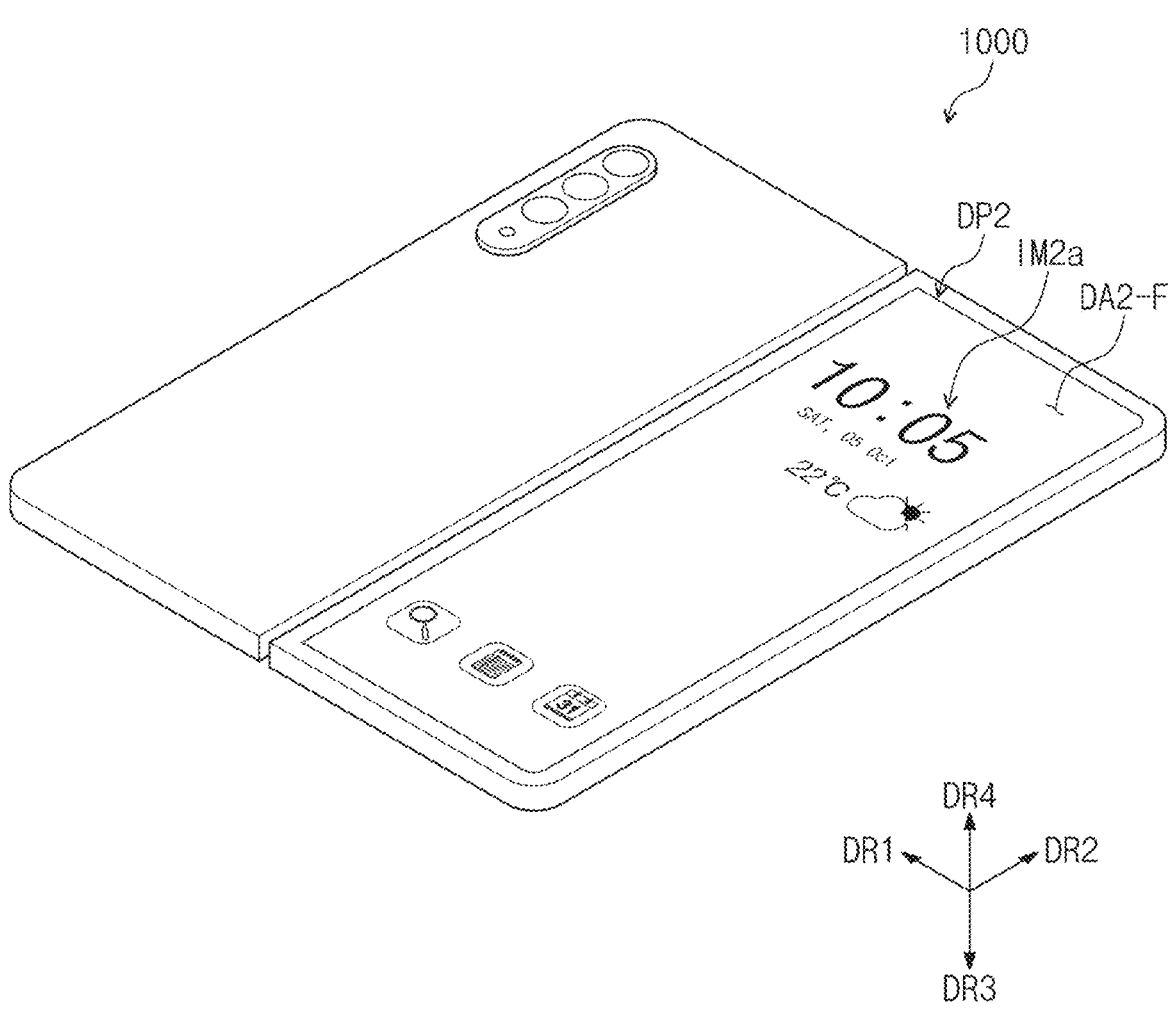
FIG. 1B is a rear perspective view of an electronic device according to an embodiment of the present disclosure.

FIG. 1A is a perspective view of an electronic device according to an embodiment of the present disclosure. FIG. 1B is a rear perspective view of an electronic device according to an embodiment of the present disclosure.

Referring to FIGS. 1A and 1B, an electronic device 1000 may refer to a device that is activated depending on an electrical signal. For example, the electronic device 1000 may display an image, and may sense inputs (e.g., external inputs) applied from the outside. The external input may be an input of the user. The input of the user may include various suitable kinds of external inputs, such as a part of a user's body, a pen PN, light, heat, and pressure.

The electronic device 1000 may include a first display panel DP1 and a second display panel DP2. The first display panel DP1 and the second display panel DP2 may be independent panels which are separated from each other. The first display panel DP1 may be referred to as a "main display panel", and the second display panel DP2 may be referred to as an "auxiliary display panel" or an "external display panel".

The first display panel DP1 may include a first display part DA1-F, and the second display panel DP2 may include a second display part DA2-F. An area of the second display panel DP2 may be smaller than an area of the first display panel DP1. The area of the first display part DA1-F, which corresponds to the size of the first display panel DP1, may be larger than the area of the second display part DA2-F, which corresponds to the size of the second display panel DP2.

The first display part DA1-F may have a plane that is parallel to or substantially parallel to a first direction DR1 and a second direction DR2, when the electronic device 1000 is unfolded. A thickness direction of the electronic device 1000 may be parallel to or substantially parallel to a third direction DR3 crossing or intersecting the first direction DR1 and the second direction DR2. Accordingly, front surfaces (e.g., top/upper surfaces) and rear surfaces (e.g., bottom/lower surfaces) of the members constituting the electronic device 1000 may be defined with respect to the third direction DR3.

The first display panel DP1 or the first display part DA1-F may include a folding area FA that may be folded and unfolded, and a plurality of non-folding areas NFA1 and NFA2 spaced apart from each other with the folding area FA interposed therebetween. The second display panel DP2 may overlap with one of the plurality of non-folding areas NFA1 or NFA2. For example, the second display panel DP2 may overlap with the first non-folding area NFA1.

A display direction of a first image IM1$a$ displayed in a portion of the first display panel DP1, for example, such as in the first non-folding area NFA1, may face away from (e.g., may be opposite to) a display direction of a second image IM2$a$ displayed in the second display panel DP2. For example, the first image IM1$a$ may be displayed in the third direction DR3, and the second image IM2$a$ may be displayed in a fourth direction DR4 facing away from (e.g., opposite to) the third direction DR3.

In an embodiment of the present disclosure, the folding area FA may be bent around a folding axis extending in a direction parallel to or substantially parallel to a long side (e.g., a long edge) of the electronic device 1000, for example, such as in a direction parallel to or substantially parallel to the second direction DR2. The folding area FA may have a suitable curvature (e.g., a given or predetermined curvature) and a suitable radius of curvature (e.g., a given or predetermined radius of curvature), when the electronic device 1000 is folded. The first non-folding area NFA1 and the second non-folding area NFA2 may face each other, and in this case, the electronic device 1000 may be inner-folded so that the first display part DA1-F is not exposed to the outside.

In an embodiment of the present disclosure, the electronic device 1000 may be outer-folded so that the first display part DA1-F is exposed to the outside. In an embodiment of the present disclosure, the electronic device 1000 may support both the inner-folding and the outer-folding from the unfolded state, but the present disclosure is not limited thereto.

An example in which one folding area FA is defined in the electronic device 1000 is illustrated in FIG. 1A, but the present disclosure is not limited thereto. For example, a plurality of folding axes and a plurality of folding areas corresponding thereto may be defined in the electronic device 1000. In this case, the electronic device 1000 may be in-folded and/or out-folded from a state where each of the plurality of folding areas is unfolded.

According to an embodiment of the present disclosure, at least one of the first display panel DP1 or the second display panel DP2 may sense an input by the pen PN, even though a digitizer is not included therein. Accordingly, because the digitizer for sensing the pen PN may be omitted, an increase in the thickness of the electronic device 1000, an increase in the weight of the electronic device 1000, and a decrease in the flexibility of the electronic device 1000 due to the addition of a digitizer may not occur. Accordingly, in addition to the first display panel DP1, the second display panel DP2 may also be designed to sense the pen PN.

Figure 2:
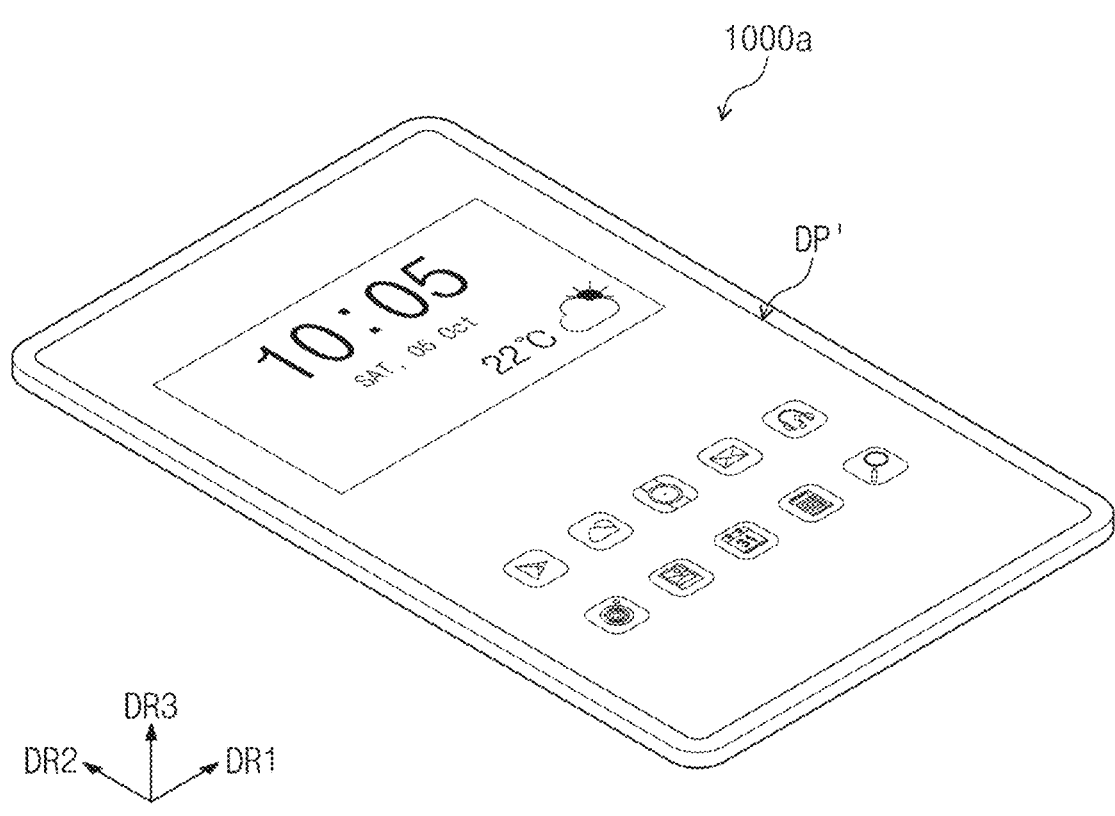
FIG. 2 is a perspective view of an electronic device according to an embodiment of the present disclosure.
Figure 3:
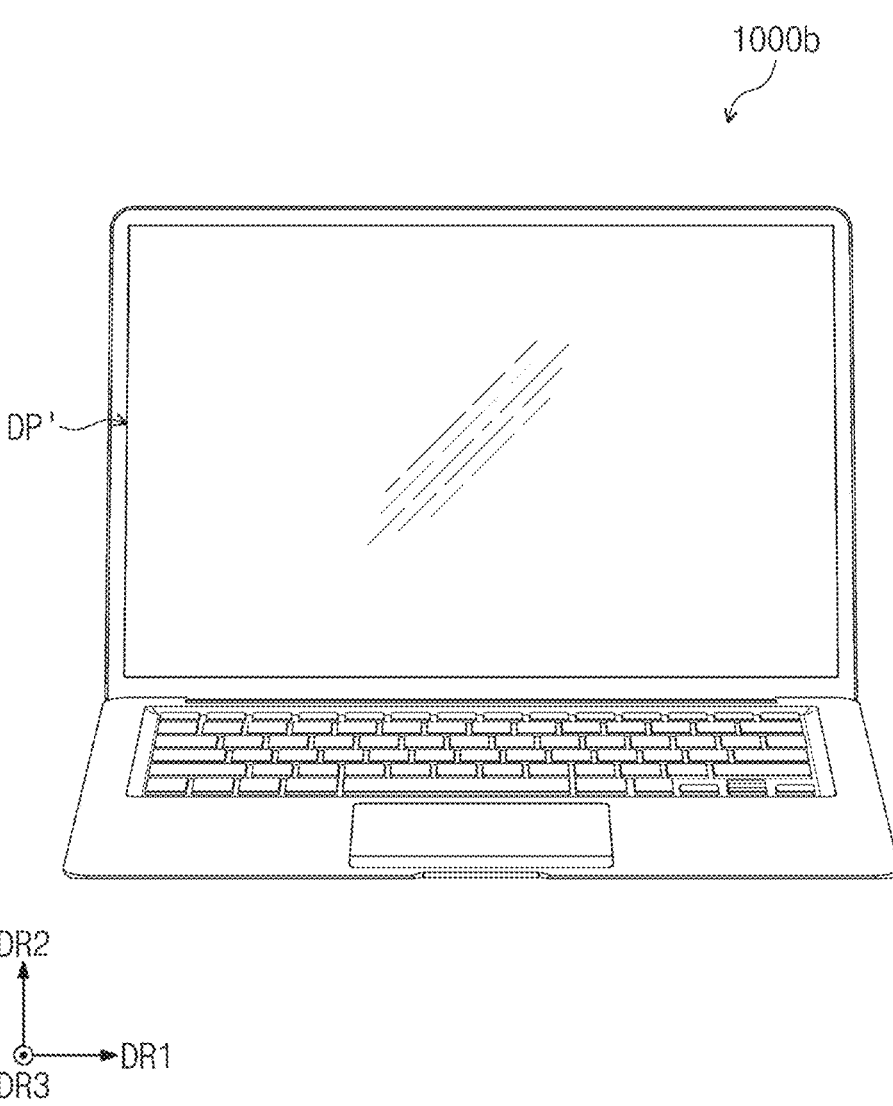
FIG. 3 is a perspective view of an electronic device according to an embodiment of the present disclosure.

FIG. 2 is a perspective view of an electronic device according to an embodiment of the present disclosure. FIG. 3 is a perspective view of an electronic device according to an embodiment of the present disclosure.

An example in which an electronic device 1000$a$ is a mobile phone is illustrated in FIG. 2, and the electronic device 1000*a* may include a display panel DP'. An example in which an electronic device 1000*b* is a laptop is illustrated in FIG. 3, and the electronic device 1000*b* may include the display panel DP'.

In an embodiment of the present disclosure, the display panel DP' may sense inputs (e.g., external inputs) applied from the outside. The external input may be an input of the user. The input of the user may include various suitable kinds of external inputs, such as a part of a user's body, the pen PN (e.g., refer to FIG. 1A), light, heat, and pressure.

According to an embodiment of the present disclosure, even though the display panel DP' may not include the digitizer, the display panel DP' may sense an input by the pen PN (e.g., refer to FIG. 1A). Accordingly, because the digitizer for sensing the pen PN may be omitted, the thickness and weight of the electronic device 1000*a* or 1000*b* may not be increased due to the addition of a digitizer.

An example in which the electronic device 1000 is of a foldable kind is illustrated in FIG. 1A, and an example in which the electronic device 1000*a* is a bar kind is illustrated in FIG. 2. However, the present disclosure is not limited thereto. For example, the embodiments described hereinafter may be applied to various suitable electronic devices, such as a rollable electronic device, a slidable electronic device, and a stretchable electronic device.

Figure 4:
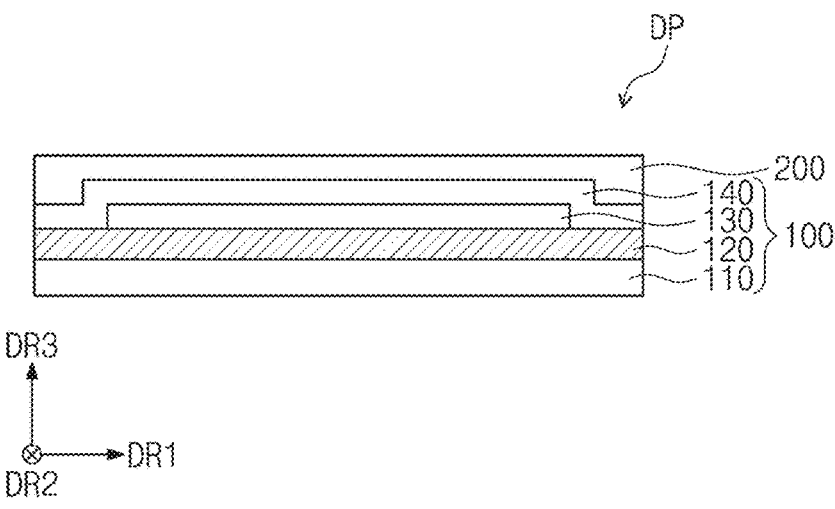
FIG. 4 is a schematic cross-sectional view of a display panel according to an embodiment of the present disclosure.

FIG. 4 is a schematic cross-sectional view of a display panel according to an embodiment of the present disclosure.

Referring to FIG. 4, the display panel DP may include a display layer 100 and a sensor layer 200.

The display layer 100 may include a base layer 110, a circuit layer 120, a light emitting element layer 130, and an encapsulation layer 140.

The base layer 110 may be a member that provides a base surface on which the circuit layer 120 is disposed. The base layer 110 may include a multi-layered structure or a single-layer structure. The base layer 110 may be implemented with a glass substrate, a metal substrate, a silicon substrate, or a polymer substrate, but the present disclosure is not limited thereto.

The circuit layer 120 may be disposed on the base layer 110. The circuit layer 120 may include an insulating layer, a semiconductor pattern, a conductive pattern, a signal line, and/or the like. An insulating layer, a semiconductor layer, and a conductive layer may be formed on the base layer 110 by a coating process or a deposition process, and the insulating layer, the semiconductor layer, and the conductive layer may then be selectively patterned through a plurality of photolithography processes.

The light emitting element layer 130 may be disposed on the circuit layer 120. The light emitting element layer 130 may include a light emitting element. For example, the light emitting element layer 130 may include an organic light emitting material, an inorganic light emitting material, an organic-inorganic light emitting material, a quantum dot, a quantum rod, a micro-LED, or a nano-LED.

The encapsulation layer 140 may be disposed on the light emitting element layer 130. The encapsulation layer 140 may protect the light emitting element layer 130 from foreign substances, such as moisture, oxygen, and dust particles.

The sensor layer 200 may be disposed on the display layer 100. The sensor layer 200 may sense an external input applied from the outside. The sensor layer 200 may be a sensor that is integrally formed to be continuous in a process of manufacturing the display layer 100, or the sensor layer 200 may be an external sensor that is attached to the display layer 100. The sensor layer 200 may be referred to as a "sensor", an "input sensing layer", an "input sensing panel", or an "electronic device for sensing input coordinates".

According to an embodiment of the present disclosure, the sensor layer 200 may sense both an input provided by a passive-kind of input means, such as a user's body, and an input provided by an input device PN (e.g., refer to FIG. 1A) for generating a magnetic field of a suitable resonant frequency (e.g., a given or predetermined resonant frequency).

Figure 5:
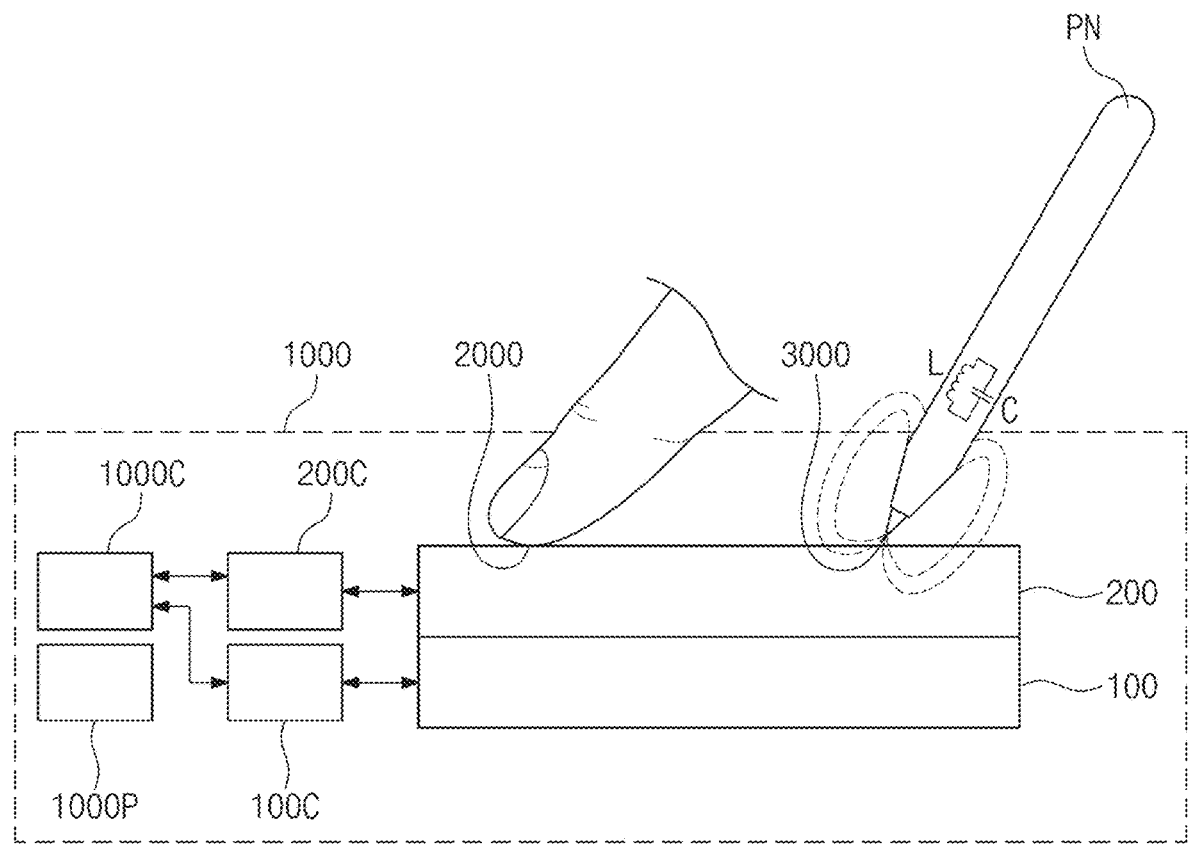
FIG. 5 is a diagram illustrating an operation of an electronic device according to an embodiment of the present disclosure.

FIG. 5 is a diagram illustrating an operation of an electronic device according to an embodiment of the present disclosure.

Referring to FIG. 5, the display device 1000 may include the display layer 100, the sensor layer 200, a display driving unit (e.g., a display driver or a display driving circuit) 100C, a sensor driving unit (e.g., a sensor driver or a sensor driving circuit) 200C, a main driving unit (e.g., a main driver or a main driving circuit) 1000C, and a power supply circuit 1000P.

The sensor layer 200 may sense a first input 2000 or a second input 3000 applied from the outside. Each of the first input 2000 and the second input 3000 may be an input means capable of providing a change in a capacitance of the sensor layer 200, or may be an input means capable of causing an induced current in the sensor layer 200. For example, the first input 2000 may be a passive-kind of input means, such as a user's body. The second input 3000 may be an input by the pen PN or an input by an RFIC tag. For example, the pen PN may be a passive-kind of pen or an active-kind of pen.

In an embodiment of the present disclosure, the pen PN may be a device that generates a magnetic field of a suitable resonant frequency (e.g., a given or predetermined resonant frequency). The pen PN may transmit an output signal based on an electromagnetic resonance manner. The pen PN may be referred to as an "input device", an "input pen", a "magnetic pen", a "stylus pen", or an "electromagnetic resonance pen".

The pen PN may include an RLC resonant circuit, and the RLC resonant circuit may include an inductor "L" and a capacitor "C". In an embodiment of the present disclosure, the RLC resonant circuit may be a variable resonant circuit having a resonant frequency that is variable. In this case, the inductor "L" may be a variable inductor, and/or the capacitor "C" may be a variable capacitor. However, the present disclosure is not particularly limited thereto.

The inductor "L" generates a current based on the magnetic field formed in the sensor layer 200. However, the present disclosure is not particularly limited thereto. For example, when the pen PN operates as an active kind, the pen PN may generate a current even though a magnetic field is not provided from the outside. The generated current is transferred to the capacitor "C". The capacitor "C" charges the current transferred from the inductor "L", and discharges the charged current to the inductor "L". Afterwards, the inductor "L" may form the magnetic field of the resonant frequency. The induced current may flow in the sensor layer 200 by the magnetic field formed by the pen PN, and the induced current may be transferred to the sensor driving unit 200C as a receive signal (e.g., a sensing signal or a signal).

The main driving unit 1000C may control all the operations of the electronic device 1000. For example, the main driving unit 1000C may control operations of the display driving unit 100C and the sensor driving unit 200C. The main driving unit 1000C may include at least one microprocessor, and may further include a graphics controller. The main driver 1000C may be referred to as an "application processor", a "central processing unit", or a "main processor".

The display driving unit 100C may drive the display layer 100. The display driving unit 100C may receive image data and a control signal from the main driving unit 1000C. The control signal may include various suitable signals. For example, the control signal may include an input vertical synchronization signal, an input horizontal synchronization signal, a main clock, a data enable signal, and/or the like.

The sensor driver 200C may drive the sensor layer 200. The sensor driver 200C may receive a control signal from the main driving unit 1000C. The control signal may include a clock signal of the sensor driving unit 200C. Also, the control signal may further include a mode selection signal for selecting a driving mode of the sensor driving unit 200C and the sensor layer 200.

The sensor driving unit 200C may be implemented with an integrated circuit (IC), and may be electrically connected to the sensor layer 200. For example, the sensor driving unit 200C may be directly mounted on a suitable area (e.g., a given or predetermined area) of the display panel. For an electrical connection with the sensor layer 200, the sensor driving unit 200C may be mounted on a separate printed circuit board in a chip-on-film (COF) manner.

The sensor driving unit 200C and the sensor layer 200 may selectively operate in a first mode or a second mode. For example, the first mode may be a mode for sensing a touch input, for example, such as the first input 2000. The second mode may be a mode for sensing an input by the pen PN, for example, such as the second input 3000. The first mode may be referred to as a "touch sensing mode", and the second mode may be referred to as a "pen sensing mode".

A switch between the first mode and the second mode may be made in various suitable manners. For example, the sensor driving unit 200C and the sensor layer 200 may be driven in the first mode and the second mode in a time division manner, and may sense the first input 2000 and the second input 3000. As another example, the switch between the first mode and the second mode may be made by a selection of the user or a specific action of the user, one of the first mode or the second mode may be enabled or disabled by the activation or deactivation of a specific application, or the switch from the first mode to the second mode or from the second mode to the first mode may be made. As another example, while the sensor driving unit 200C and the sensor layer 200 alternately operate in the first mode and the second mode, the first mode may be maintained when the first input 2000 is sensed, or the second mode may be maintained when the second input 3000 is sensed.

The sensor driving unit 200C may calculate coordinates of an input based on the signal received from the sensor layer 200, and may provide a coordinate signal including information about the coordinates to the main driving unit 1000C. The main driving unit 1000C performs an operation corresponding to the user input based on the coordinate signal. For example, the main driving unit 1000C may drive the display driving unit 100C so that a new application image is displayed in the display layer 100.

The power supply circuit 1000P may include a power management integrated circuit (PMIC). The power supply circuit 1000P may generate a plurality of driving voltages for driving the display layer 100, the sensor layer 200, the display driving unit 100C, and the sensor driving unit 200C. For example, the plurality of driving voltages may include a high gate voltage, a low gate voltage, a first driving voltage (e.g., an ELVSS voltage), a second driving voltage (e.g., an ELVDD voltage), an initialization voltage, and the like, but the present disclosure is not particularly limited thereto.

Figure 6:
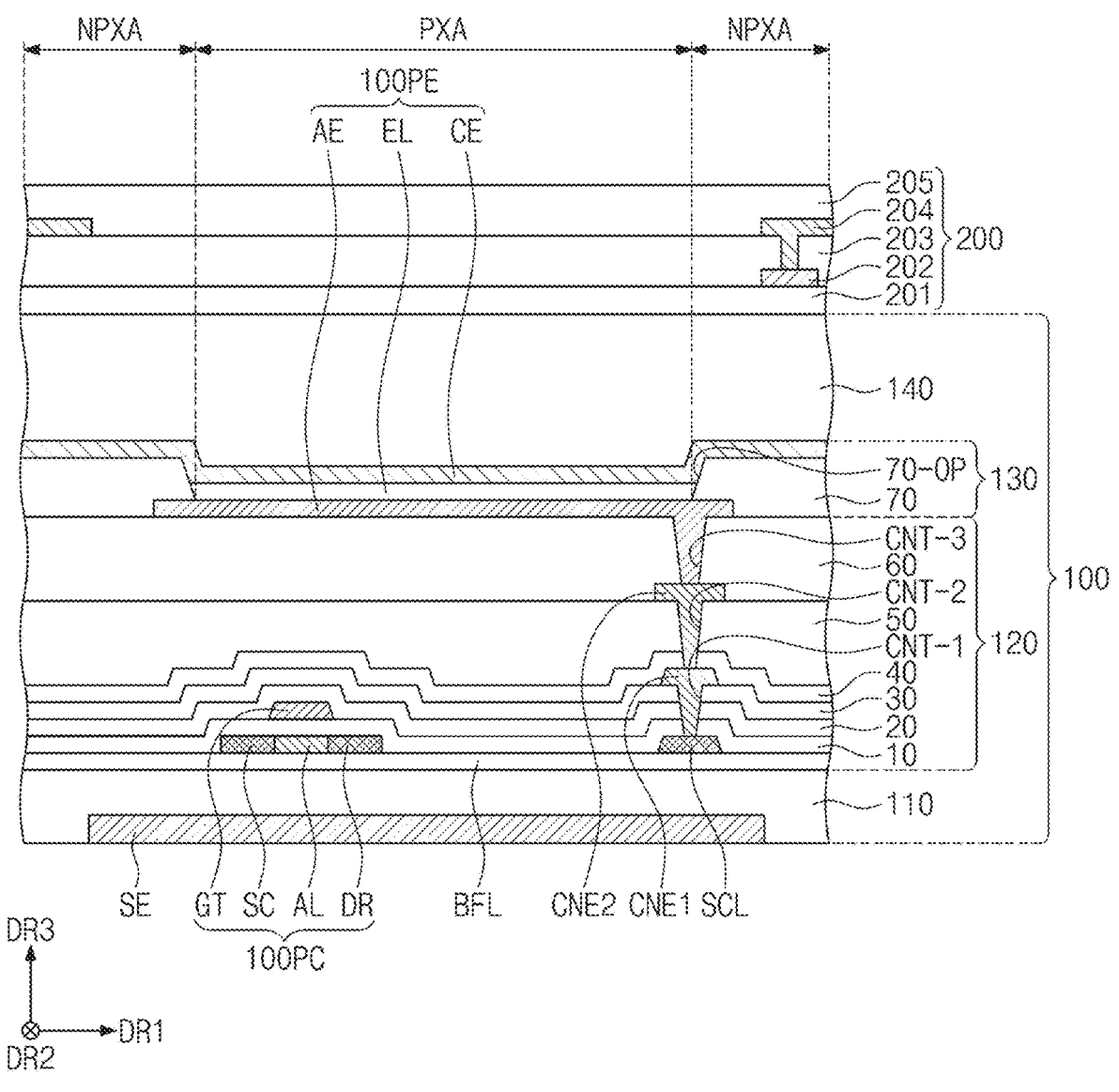
FIG. 6 is a cross-sectional view of a display panel according to an embodiment of the present disclosure.

FIG. 6 is a cross-sectional view of a display panel according to an embodiment of the present disclosure. In FIG. 6, the components that are the same as or substantially the same as (or similar to) those described above with reference to FIG. 4 are denoted by the same reference numerals/signs, and thus, redundant description thereof may not be repeated.

Referring to FIG. 6, the base layer 110 may include a first charging electrode SE. In this case, the base layer 110 may be referred to as an "auxiliary layer 110". This will be described in more detail below.

At least one buffer layer BFL may be formed on an upper surface of the base layer 110. The buffer layer BFL may improve a bonding force between the base layer 110 and a semiconductor pattern. The buffer layer BFL may be formed in a multi-layered structure. As another example, the display layer 100 may further include a barrier layer. The buffer layer BFL may include at least one of silicon oxide, silicon nitride, or silicon oxynitride. For example, the buffer layer BFL may include a structure in which a silicon oxide layer and a silicon nitride layer are stacked alternately on one another.

A semiconductor pattern (SC, AL, DR, SCL) may be disposed on the buffer layer BFL. The semiconductor pattern (SC, AL, DR, SCL) may include polysilicon. However, the present disclosure is not limited thereto. For example, the semiconductor pattern (SC, AL, DR, SCL) may include amorphous silicon, a low-temperature polycrystalline silicon, or an oxide semiconductor.

FIG. 6 shows a portion (e.g., only a portion) of the semiconductor pattern (SC, AL, DR, SCL), and the semiconductor pattern (SC, AL, DR, SCL) may be further disposed in any other suitable area. The semiconductor patterns (SC, AL, DR, SCL) may be arranged across pixels in compliance with a suitable rule (e.g., a specific or predetermined rule). An electrical property of the semiconductor pattern (SC, AL, DR, SCL) may be differently determined depending on whether it is doped or not. The semiconductor pattern (SC, AL, DR, SCL) may include a first area (SC, DR, SCL) having a conductivity that is relatively higher, and a second area AL having a conductivity that is relatively lower. The first area (SC, DR, SCL) may be doped with an N-type dopant or a P-type dopant. A P-type transistor may include an area doped with the P-type dopant, and an N-type transistor may include an area doped with the N-type dopant. The second area AL may be an undoped area, or an area doped with a concentration lower than a concentration in the first area.

The conductivity of the first area (SC, DR, SCL) may be greater than the conductivity of the second area AL, and may serve or substantially serve as an electrode or a signal line. The second area AL may correspond to or substantially correspond to an active area (e.g., a channel) AL of a transistor 100PC. In other words, a portion AL of the semiconductor pattern (SC, AL, DR, SCL) may be the active area AL of the transistor 100PC, another portion (SC, DR) thereof may be a source area SC or a drain area DR of the transistor 100PC, and the another portion SCL thereof may be a connection electrode or a connection signal line SCL.

Each pixel may be expressed by an equivalent circuit including seven transistors, one capacitor, and a light emitting element, but the equivalent circuit of the pixel may be variously modified as needed or desired. One transistor 100PC and one light emitting element 100PE, which are included in the pixel (e.g., in one pixel), are illustrated in FIG. 6 as an example.

The source area SC, the active area AL, and the drain area DR of the transistor 100PC may be formed from the semiconductor pattern (SC, AL, DR, SCL). The source area SC and the drain area DR may extend in directions facing away from each other (e.g., in opposite directions from each other) from the active area AL in a cross-sectional view. A portion of the connection signal line SCL formed from the semiconductor pattern (SC, AL, DR, SCL) is illustrated in FIG. 6. The connection signal line SCL may be connected to the drain area DR of the transistor 100PC in another view (e.g., in a plan view).

A first insulating layer 10 may be disposed on the buffer layer BFL. The first insulating layer 10 may overlap with a plurality of the pixels in common, and may cover the semiconductor pattern (SC, AL, DR, SCL). The first insulating layer 10 may be an inorganic layer and/or an organic layer, and may have a single-layer or multi-layered structure. The first insulating layer 10 may include at least one of aluminum oxide, titanium oxide, silicon oxide, silicon nitride, silicon oxynitride, zirconium oxide, and/or hafnium oxide. In an embodiment, the first insulating layer 10 may be a single silicon oxide layer. In addition to the first insulating layer 10, an insulating layer of the circuit layer 120 to be described in more detail below may also be an inorganic layer and/or an organic layer, and may have a single-layer or multilayered structure. The inorganic layer may include at least one of the above described materials, but the present disclosure is not limited thereto.

A gate GT of the transistor 100PC is disposed on the first insulating layer 10. The gate GT may be a portion of a metal pattern. The gate GT overlaps with the active area AL. The gate GT may function as a mask in a process of doping or reducing the semiconductor pattern (SC, AL, DR, SCL).

A second insulating layer 20 may be disposed on the first insulating layer 10, and may cover the gate GT. The second insulating layer 20 may overlap with the pixels in common. The second insulating layer 20 may be an inorganic layer and/or an organic layer, and may have a single-layer or multi-layered structure. The second insulating layer 20 may include at least one of silicon oxide, silicon nitride, or silicon oxynitride. In an embodiment, the second insulating layer 20 may have a multi-layered structure including a silicon oxide layer and a silicon nitride layer.

A third insulating layer 30 may be disposed on the second insulating layer 20. The third insulating layer 30 may have a single-layer or multi-layered structure. In an embodiment, the third insulating layer 30 may have a multi-layered structure including a silicon oxide layer and a silicon nitride layer.

A first connection electrode CNE1 may be disposed on the third insulating layer 30. The first connection electrode CNE1 may be connected to the connection signal line SCL through a contact hole CNT-1 penetrating the first, second, and third insulating layers 10, 20, and 30.

A fourth insulating layer 40 may be disposed on the third insulating layer 30. The fourth insulating layer 40 may be a single silicon oxide layer. A fifth insulating layer 50 may be disposed on the fourth insulating layer 40. The fifth insulating layer 50 may be an organic layer.

A second connection electrode CNE2 may be disposed on the fifth insulating layer 50. The second connection electrode CNE2 may be connected to the first connection electrode CNE1 through a contact hole CNT-2 penetrating the fourth insulating layer 40 and the fifth insulating layer 50.

A sixth insulating layer 60 may be disposed on the fifth insulating layer 50, and may cover the second connection electrode CNE2. The sixth insulating layer 60 may be an organic layer.

The light emitting element layer 130 may be disposed on the circuit layer 120. The light emitting element layer 130 may include the light emitting element 100PE. For example, the light emitting element layer 130 may include an organic light emitting material, an inorganic light emitting material, an organic-inorganic light emitting material, a quantum dot, a quantum rod, a micro-LED, or a nano-LED. Hereinafter, an example in which the light emitting element 100PE is an organic light emitting element will be described in more detail, but the present disclosure is not limited thereto.

The light emitting element 100PE may include a first electrode AE, a light emitting layer EL, and a second electrode CE.

The first electrode AE may be disposed on the sixth insulating layer 60. The first electrode AE may be connected to the second connection electrode CNE2 through a contact hole CNT-3 penetrating the sixth insulating layer 60.

A pixel defining layer 70 may be disposed on the sixth insulating layer 60, and may cover a portion of the first electrode AE. An opening 70-OP is defined in the pixel defining layer 70. The opening 70-OP of the pixel defining layer 70 exposes at least a portion of the first electrode AE.

The first display part DA1-F (e.g., refer of FIG. 1A) may include an emission area PXA, and a non-emission area NPXA adjacent to the emission area PXA. The non-emission area NPXA may surround (e.g., around a periphery of) the emission area PXA. In an embodiment, the emission area PXA is defined to correspond to a partial area of the first electrode AE exposed by the opening 70-OP.

The light emitting layer EL may be disposed on the first electrode AE. The light emitting layer EL may be disposed in the area corresponding to the opening 70-OP. In other words, the light emitting layer EL may be independently formed for each pixel. When the light emitting layer EL is independently formed for each pixel, each of the light emitting layers EL may emit light of at least one of a blue color, a red color, or a green color. However, the present disclosure is not limited thereto. For example, the light emitting layer EL (which may also be referred to as an emission layer) may be connected to the pixels in common. In this case, the light emitting layer EL may provide a blue light, or may provide a white light.

The second electrode CE may be disposed on the light emitting layer EL. The second electrode CE may have an integrated shape, and may be included in a plurality of the pixels in common.

In an embodiment of the present disclosure, a hole control layer may be interposed between the first electrode AE and the light emitting layer EL. The hole control layer may be disposed in common in the emission area PXA and the non-emission area NPXA. The hole control layer may include a hole transport layer, and may further include a hole injection layer. An electron control layer may be disposed between the light emitting layer EL and the second electrode CE. The electron control layer may include an electron transport layer, and may further include an electron injection layer. The hole control layer and the electron control layer may be formed, in common, in a plurality of the pixels by using an open mask or an inkjet process.

The encapsulation layer 140 may be disposed on the light emitting element layer 130. The encapsulation layer 140 may include an inorganic layer, an organic layer, and an inorganic layer that are sequentially stacked, but the layers constituting the encapsulation layer 140 are not particularly limited thereto. The inorganic layers may protect the light emitting element layer 130 from moisture and oxygen, and the organic layer may protect the light emitting element layer 130 from a foreign material, such as dust particles. The inorganic layers may include a silicon nitride layer, a silicon oxynitride layer, a silicon oxide layer, a titanium oxide layer, an aluminum oxide layer, or the like. The organic layer may include an acrylic-based organic layer, but the present disclosure is not limited thereto.

The sensor layer 200 may include a base layer 201, a first conductive layer 202, a sensing insulating layer 203, a second conductive layer 204, and a cover insulating layer 205.

The base layer 201 may be an inorganic layer including at least one of silicon nitride, silicon oxynitride, or silicon oxide. As another example, the base layer 201 may be an organic layer including an epoxy resin, an acrylate resin, or an imide-based resin. The base layer 201 may have a single-layer structure, or may have a structure in which multiple layers are stacked in the third direction DR3.

Each of the first conductive layer 202 and the second conductive layer 204 may have a single-layer structure, or may have a structure in which multiple layers are stacked in the third direction DR3

Each of the first conductive layer 202 and the second conductive layer 204 of the single-layer structure may include a metal layer or a transparent conductive layer. The metal layer may include molybdenum, silver, titanium, copper, aluminum, or a suitable alloy thereof. The transparent conductive layer may include a transparent conductive oxide, such as indium tin oxide (ITO), indium zinc oxide (IZO), zinc oxide (ZnO), or indium zinc tin oxide (IZTO). In addition, the transparent conductive layer may include a conductive polymer such as poly(3,4-ethylenedioxythiophene) (PEDOT), a metal nanowire, graphene, and/or the like.

Each of the first conductive layer 202 and the second conductive layer 204 of the multi-layered structure may include a plurality of metal layers. The metal layers may have, for example, a three-layered structure of titanium/ aluminum/titanium. The conductive layer of the multi-layered structure may include at least one metal layer and at least one transparent conductive layer.

At least one of the sensing insulating layer 203 or the cover insulating layer 205 may include an inorganic layer. The inorganic layer may include at least one of aluminum oxide, titanium oxide, silicon oxide, silicon nitride, silicon oxynitride, zirconium oxide, and/or hafnium oxide.

At least one of the sensing insulating layer 203 or the cover insulating layer 205 may include an organic layer. The organic layer may include at least one of an acrylic-based resin, a methacrylic-based resin, polyisoprene, a vinyl-based resin, an epoxy-based resin, a urethane-based resin, a cellulose-based resin, a siloxane-based resin, a polyimide-based resin, a polyamide-based resin, and/or a perylene-based resin.

Figure 7:
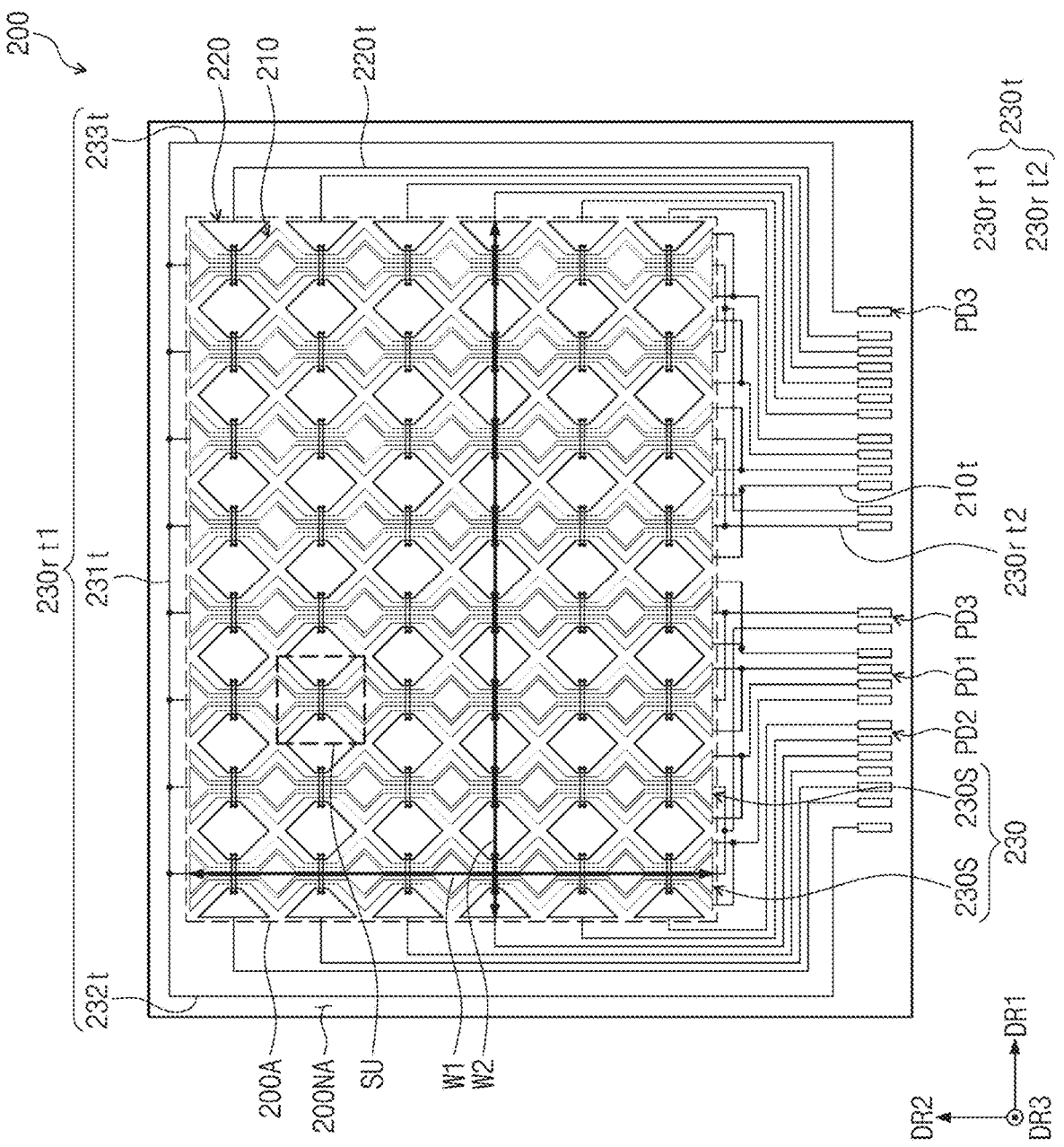
FIG. 7 is a plan view of a sensor layer according to an embodiment of the present disclosure.
Figure 8:
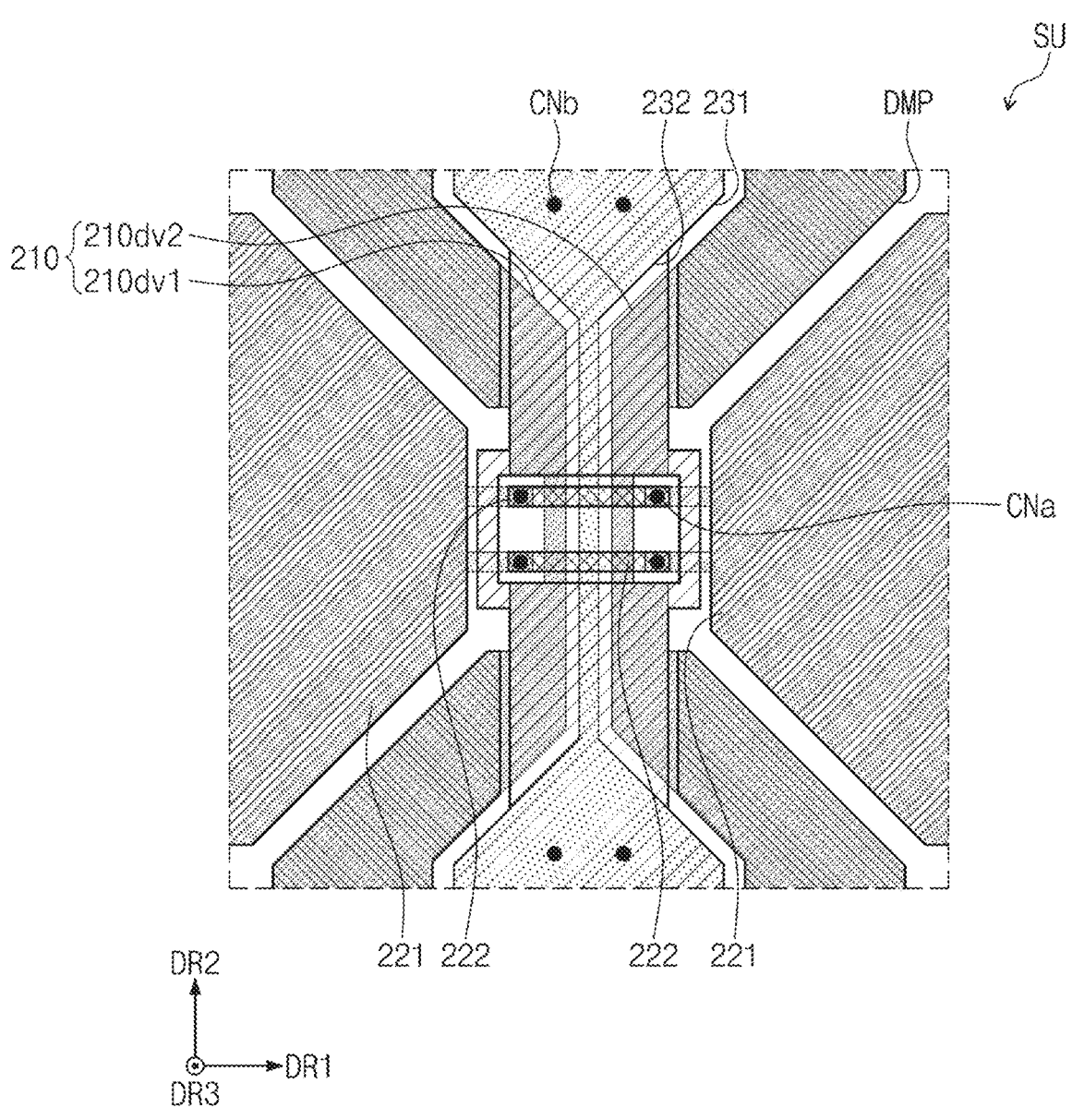
FIG. 8 is an enlarged plan view of one sensing unit according to an embodiment of the present disclosure.
Figure 9A:
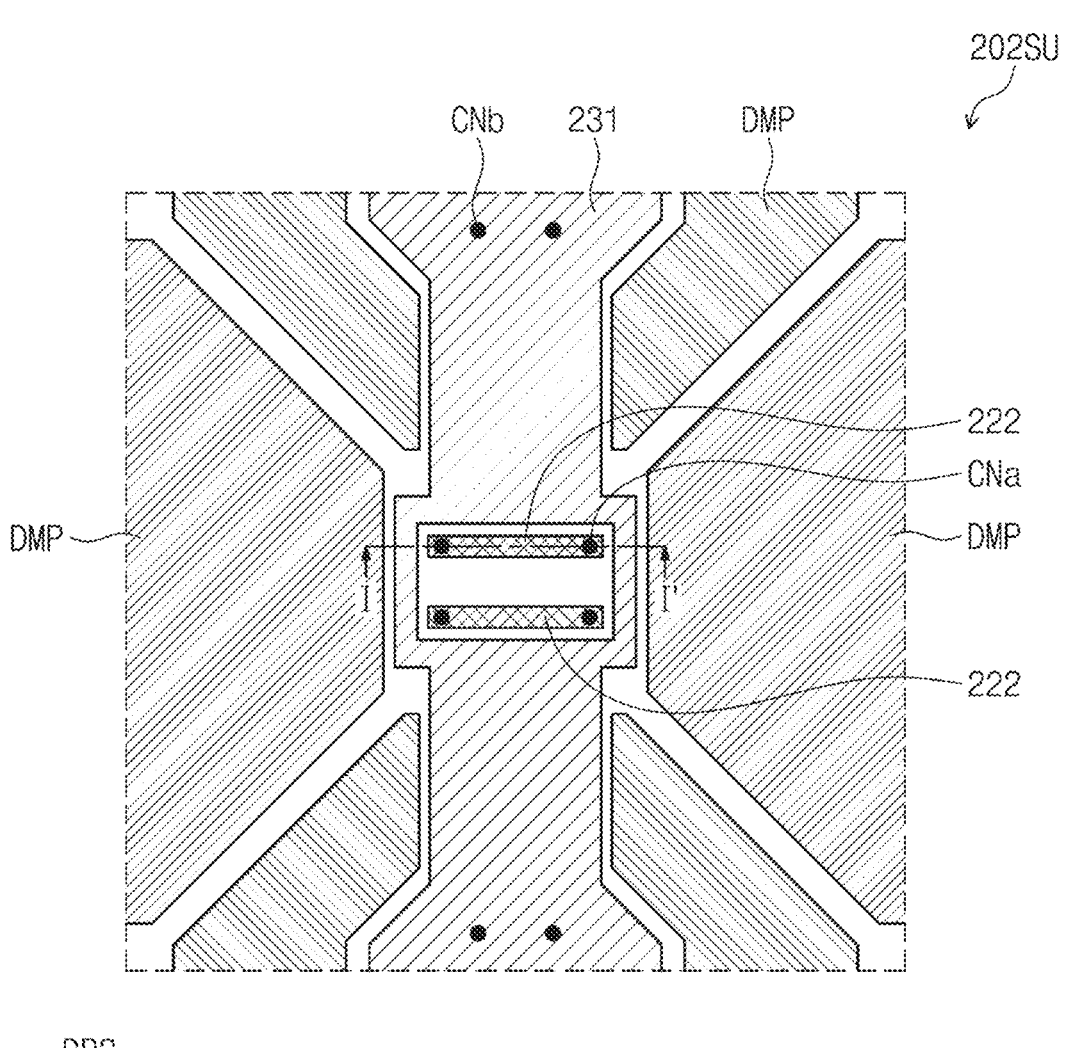
FIG. 9A is a plan view illustrating a first conductive layer of a sensing unit according to an embodiment of the present disclosure.
Figure 9A:
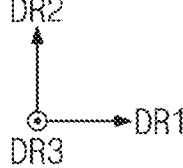
Figure 9B:
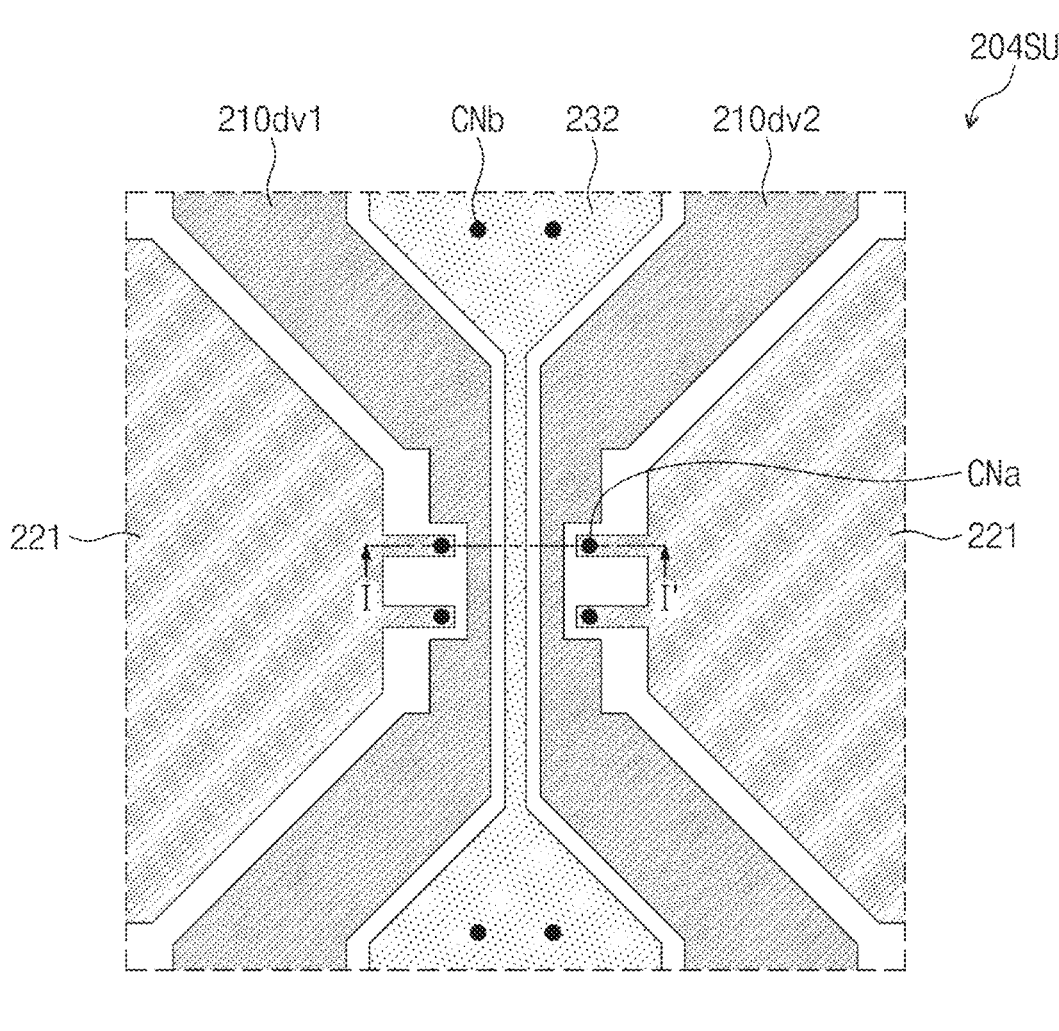
FIG. 9B is a plan view illustrating a second conductive layer of a sensing unit according to an embodiment of the present disclosure.
Figure 9B:
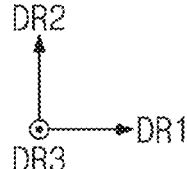
Figure 9C:
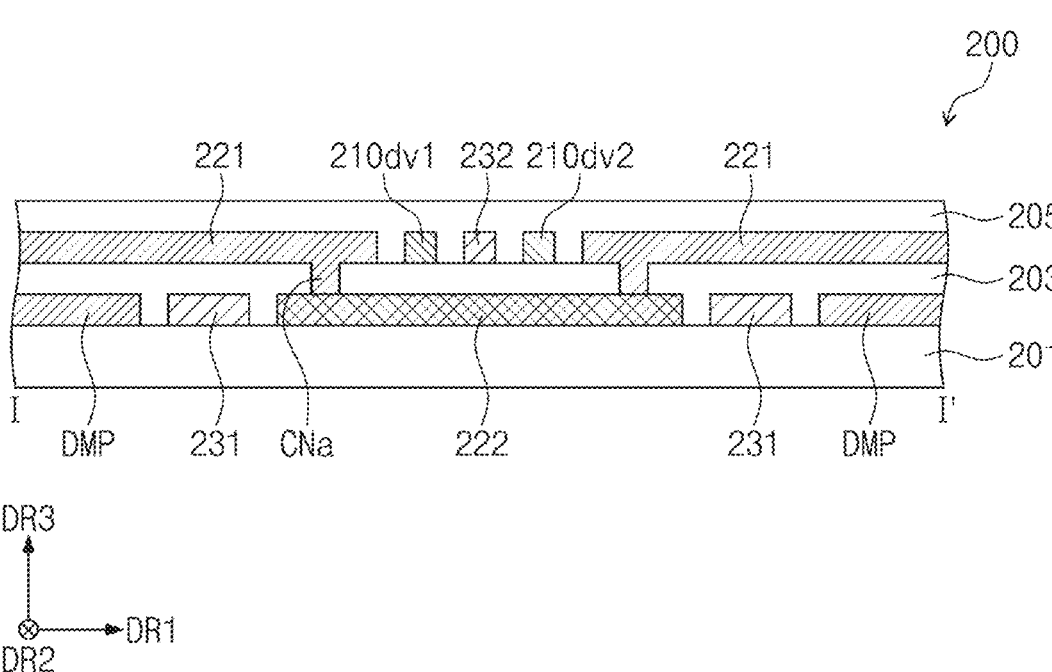
FIG. 9C is a cross-sectional view of a sensor layer taken along the line I-I' of each of FIGS. 9A and 9B according to an embodiment of the present disclosure.

FIG. 7 is a plan view of a sensor layer according to an embodiment of the present disclosure. FIG. 8 is an enlarged plan view of one sensing unit according to an embodiment of the present disclosure. FIG. 9A is a plan view illustrating a first conductive layer of a sensing unit according to an embodiment of the present disclosure. FIG. 9B is a plan view illustrating a second conductive layer of a sensing unit according to an embodiment of the present disclosure. FIG. 9C is a cross-sectional view of a sensor layer taken along the line I-I' of each of FIGS. 9A and 9B according to an embodiment of the present disclosure.

Referring to FIGS. 7 to 9C, an active area 200A and a peripheral area 200NA adjacent to the active area 200A may be defined in the sensor layer 200. The active area 200A may be an area that is activated by an electrical signal. For example, the active area 200A may be an area in which an input is sensed.

A plurality of sensing units (e.g., a plurality of sensing regions or areas) SU may be disposed in the active area 200A, and may be defined in the sensor layer 200. The plurality of sensing units SU may be arranged along the first direction DR1 and the second direction DR2.

The sensor layer 200 may include a plurality of first electrodes 210, a plurality of second electrodes 220, and a plurality of auxiliary electrodes 230.

The plurality of first electrodes 210 and the plurality of second electrodes 220 may cross each other so as to be insulated from each other. Each of the plurality of first electrodes 210 may extend along the second direction DR2. The plurality of first electrodes 210 may be arranged to be spaced apart from each other along the first direction DR1.

Each of the plurality of second electrodes 220 may extend along the first direction DR1. The plurality of second electrodes 220 may be arranged to be spaced apart from each other along the second direction DR2.

An area of each of the plurality of first electrodes 210 may be smaller than an area of each of the plurality of second electrodes 220.

In a plan view, a first length W1 of each of the plurality of first electrodes 210 in the second direction DR2 may be smaller than a second length W2 of each of the plurality of second electrodes 220 in the first direction DR1.

The sensing unit SU of the sensor layer 200 may refer to an area in which one first electrode 210 and one second electrode 220 cross each other. The sensing unit SU may include one first electrode 210 from among the plurality of first electrodes 210 and one second electrode 220 from among the plurality of second electrodes 220.

Each of the plurality of first electrodes 210 may include division electrodes 210dv1 and 210dv2. The division electrodes 210dv1 and 210dv2 may extend in the second direction DR2, and may be spaced apart from each other in the first direction DR1. The division electrodes 210dv1 and 210dv2 may be symmetric or substantially symmetric with each other with respect to a line extending in the second direction DR2.

Each of the plurality of second electrodes 220 may include a sensing pattern 221 and a bridge pattern 222. The sensing pattern 221 and the bridge pattern 222 may be disposed in different layers from each other, and may be electrically connected to each other through a first contact CNa. For example, the bridge pattern 222 may be included in a first conductive layer 202SU, and the sensing pattern 221 and the first division electrodes 210dv1 and 210dv2 may be included in a second conductive layer 204SU. The first conductive layer 202SU may be included in the first conductive layer 202 described above with reference to FIG. 6, and the second conductive layer 204SU may be included in the second conductive layer 204.

Each of the plurality of auxiliary electrodes 230 may extend in the second direction DR2. The plurality of auxiliary electrodes 230 may be arranged to be spaced apart from each other along the first direction DR1. The plurality of auxiliary electrodes 230 may be insulated from the plurality of second electrodes 220.

In an embodiment of the present disclosure, each of the plurality of auxiliary electrodes 230 may include at least one pattern electrode 230S. For example, two or more pattern electrodes 230S may be connected in parallel with each other. The number of pattern electrodes 230S included in each of the plurality of auxiliary electrodes 230 may be variously modified as needed or desired. For example, as the number of pattern electrodes 230S included in each of the plurality of auxiliary electrodes 230 is increased, a resistance of each of the plurality of auxiliary electrodes 230 may be decreased. In this case, the efficiency of a power (e.g., a power consumption) may be improved, and a sensitivity of the sensing may be improved. On the other hand, as the number of pattern electrodes 230S included in each of the plurality of auxiliary electrodes 230 is decreased, a loop coil pattern formed by using the plurality of auxiliary electrodes 230 may be implemented in more various desired shapes.

An example in which one auxiliary electrode 230 includes two pattern electrodes 230S is illustrated in FIG. 7, but the present disclosure is not particularly limited thereto. The pattern electrodes 230S may be arranged in a one-to-one correspondence with the plurality of first electrodes 210. Accordingly, one sensing unit SU may further include a portion of one pattern electrode 230S.

Each of the plurality of first electrodes 210 may surround (e.g., around a periphery of) the corresponding pattern electrode 230S. A coupling capacitor may be defined between one first electrode 210 and one auxiliary electrode 230. In this case, an induced current generated in a process of sensing a pen may be transferred from the auxiliary electrode 230 to the first electrode 210 through a coupling capacitor Ccp (e.g., refer to FIG. 18). In other words, the auxiliary electrode 230 may play a role in reinforcing a signal (e.g., a current) to be transferred from the first electrode 210 to the sensor driving unit 200C. Accordingly, when a phase of a signal induced on the auxiliary electrode 230 and a phase of a signal induced on the first electrode 210 are matched with each other, a greatest effect may be obtained. Accordingly, the center of each of the plurality of first electrodes 210 in the second direction DR2 and the center of each of the plurality of auxiliary electrodes 230 in the second direction DR2 may overlap with each other. Also, the center of each of the plurality of first electrodes 210 in the first direction DR1 and the center of each of the plurality of auxiliary electrodes 230 in the first direction DR1 may overlap with each other.

In an embodiment of the present disclosure, because one auxiliary electrode 230 may include two pattern electrodes 230S, one auxiliary electrode 230 may correspond to (e.g., may overlap with) two first electrodes 210. Accordingly, the number of first electrodes 210 included in the sensor layer 200 may be more than the number of auxiliary electrodes 230. For example, the number of first electrodes 210 may be equal to a product of a product of the number of auxiliary electrodes 230 included in the sensor layer 200 and the number of pattern electrodes 230S included in each of the auxiliary electrodes 230. In FIG. 7, the number of first electrodes 210 may be 8, the number of auxiliary electrodes 230 may be 4, and the number of pattern electrodes 230S included in each of the auxiliary electrodes 230 may be 2.

Each of the plurality of auxiliary electrodes 230 may include a first auxiliary pattern 231 and a second auxiliary pattern 232. The first auxiliary pattern 231 and the second auxiliary pattern 232 may be disposed in different layers from each other. The first auxiliary pattern 231 and the second auxiliary pattern 232 may be electrically connected to each other through a second contact CNb. The first auxiliary pattern 231 may be included in the first conductive layer 202SU, and the second auxiliary pattern 232 may be included in the second conductive layer 204SU.

In an embodiment of the present disclosure, a portion of the first auxiliary pattern 231 may overlap with a portion of each of the first division electrodes 210dv1 and 210dv2. Accordingly, a coupling capacitance may be provided (e.g., formed) between the first electrode 210 and the auxiliary electrode 230.

In an embodiment of the present disclosure, the first conductive layer 202SU may further include dummy patterns DMP. Each of the dummy patterns DMP may be electrically floated, or may be electrically grounded. In an embodiment of the present disclosure, the dummy patterns DMP may be omitted as needed or desired.

The sensor layer 200 may further include a plurality of first trace lines 210t, a plurality of first pads PD1 connected to the first trace lines 210t in a one-to-one correspondence, a plurality of second trace lines 220t, and a plurality of second pads PD2 connected to the second trace lines 220t in a one-to-one correspondence, which may be disposed in the peripheral area 200NA.

The first trace lines 210t may be electrically connected to the first electrodes 210 in a one-to-one correspondence. The two first division electrodes 210dv1 and 210dv1 included in one first electrode 210 may be connected to one of the first trace lines 210t. Each of the first trace lines 210t may include a plurality of branch parts for a connection with the two first division electrodes 210dv1 and 210dv1. In an embodiment of the present disclosure, the two first division electrodes 210dv1 and 210dv1 may be connected to each other within the active area 200A.

The second trace lines 220t may be electrically connected to first ends and second ends of the second electrodes 220 in a one-to-one correspondence. In other words, one second electrode 220 may be connected to two second trace lines 220t. A connection manner of the second trace lines 220t may be referred to as a "double routing manner".

The sensor layer 200 may further include a charging trace line 230t and a plurality of third pads PD3 disposed in the peripheral area 200NA.

The charging trace line 230rt may include a (3-1)-th trace line 230rt1 and (3-2)-th trace lines 230rt2.

The plurality of third pads PD3 may be connected to a first end and a second end of the (3-1)-th trace line 230rt1, and may include third pads PD3 connected to the (3-2)-th trace lines 230rt2, respectively.

The (3-1)-th trace line 230rt1 may be electrically connected to the auxiliary electrodes 230. For example, the (3-1)-th trace line 230rt1 may be electrically connected to all of the auxiliary electrodes 230. In this case, the plurality of auxiliary electrodes 230 may be electrically connected to each other. The (3-1)-th trace line 230rt1 may include a first line portion 231t extending along the first direction DR1 and electrically connected to the first auxiliary electrodes 230, a second line portion 232t extending from a first end of the first line portion 231t in the second direction DR2, and a third line portion 233t extending from a second end of the first line portion 231t in the second direction DR2.

In an embodiment of the present disclosure, each of a resistance of the second line portion 232t and a resistance of the third line portion 233t may be the same or substantially the same as a resistance of one of the auxiliary electrodes 230. Accordingly, the second line portion 232t and the third line portion 233t may serve as one of the auxiliary electrodes 230, and thus, the same or substantially the same effect as that in which the auxiliary electrodes 230 are disposed in the peripheral area 200NA may be obtained. For example, one of the second line portion 232t and/or the third line portion 233t and one of the auxiliary electrodes 230 may form a coil. Accordingly, a pen located in an area close to the peripheral area 200NA may also be sufficiently charged by a loop including the second line portion 232t or the third line portion 233t.

In an embodiment of the present disclosure, to adjust the resistance of the second line portion 232t and the resistance of the third line portion 233t, a width of the second line portion 232t in the first direction DR1 and a width of the third line portion 233t in the first direction DR1 may be adjusted. However, the present disclosure is not limited thereto. For example, the first to third line portions 231t, 232t, and 233t may have the same or substantially the same width as each other.

The (3-2)-th trace lines 230rt2 may be connected to the auxiliary electrodes 230 in a one-to-one correspondence. In other words, the number of (3-2)-th trace lines 230rt2 may correspond to the number of auxiliary electrodes 230. Four (3-2)-th trace lines 230rt2 are illustrated in FIG. 7 as an example.

Figure 10A:
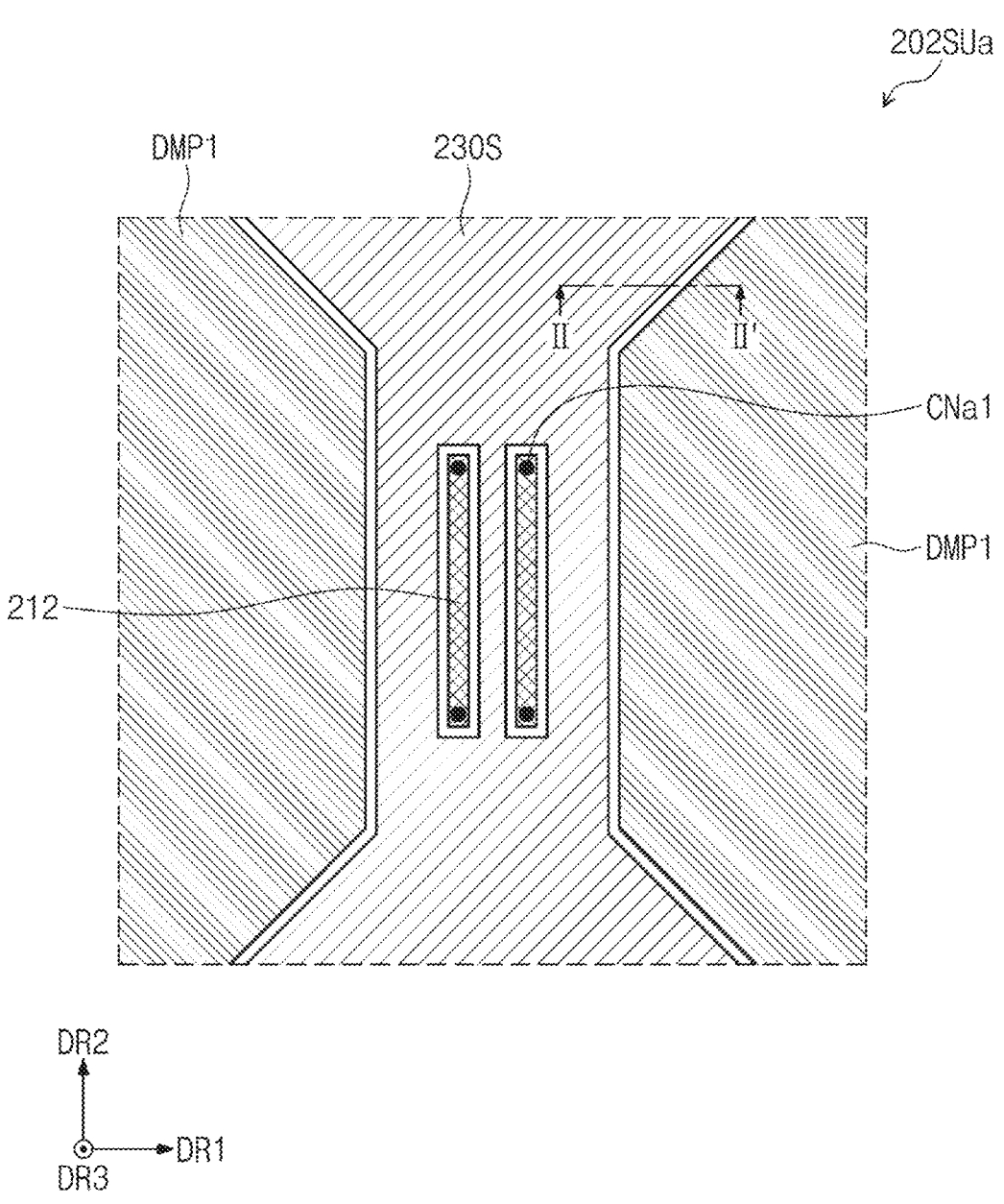
FIG. 10A is a plan view illustrating a first conductive layer of a sensing unit according to an embodiment of the present disclosure.
Figure 10B:
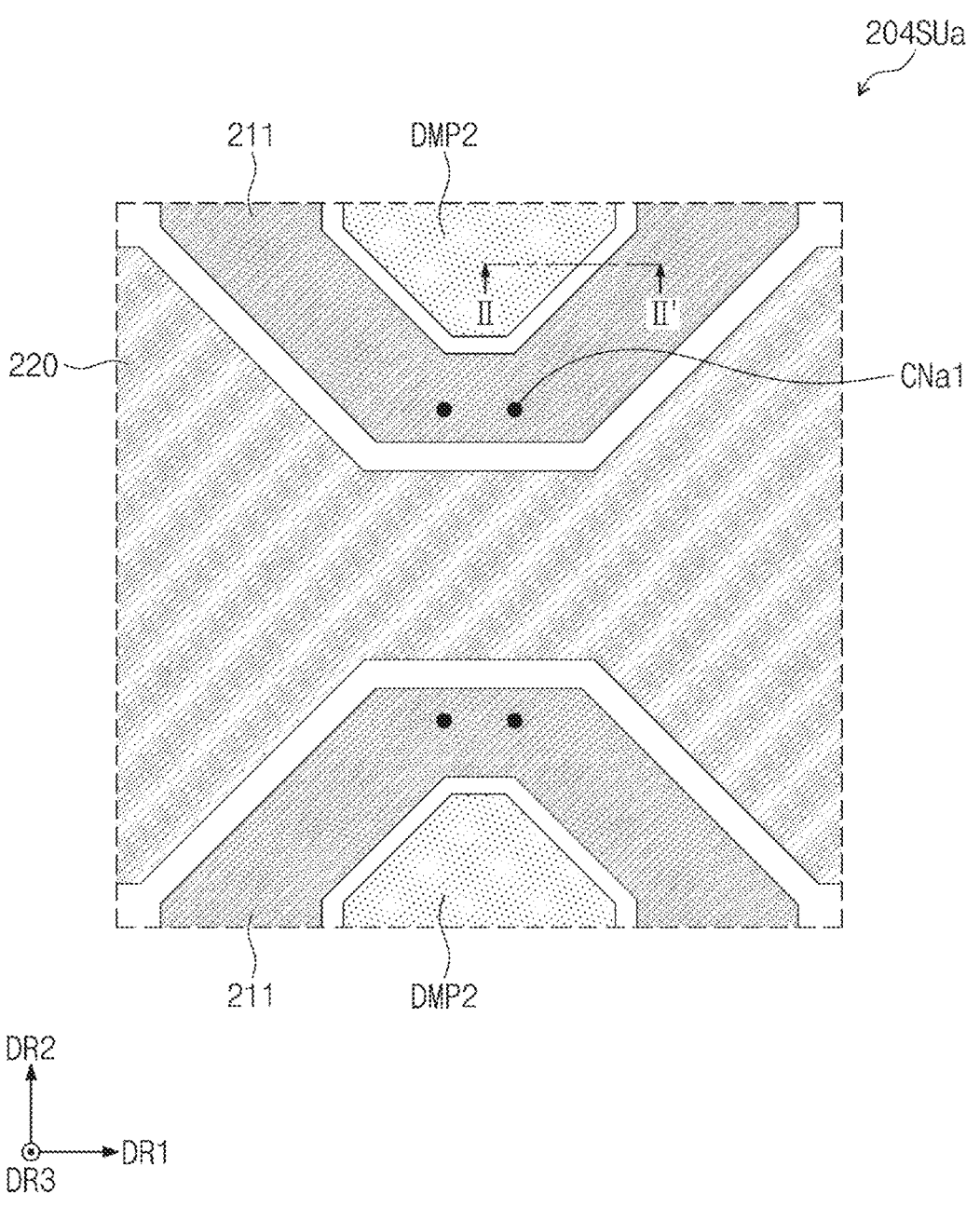
FIG. 10B is a plan view illustrating a second conductive layer of a sensing unit according to an embodiment of the present disclosure.
Figure 10C:
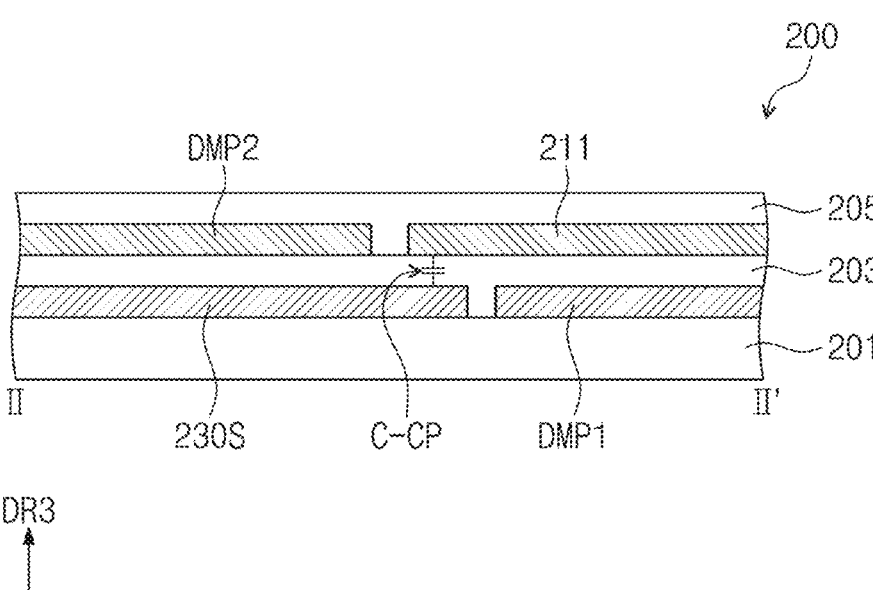
FIG. 10C is a cross-sectional view of a sensor layer taken along the line II-II' of each of FIGS. 10A and 10B according to an embodiment of the present disclosure.

FIG. 10A is a plan view illustrating a first conductive layer of a sensing unit according to an embodiment of the present disclosure. FIG. 10B is a plan view illustrating a second conductive layer of a sensing unit according to an embodiment of the present disclosure. FIG. 10C is a cross-sectional view of a sensor layer taken along the line II-II' of each of FIGS. 10A and 10B according to an embodiment of the present disclosure.

Referring to FIGS. 10A to 10C, each of the plurality of first electrodes 210 may include first sensing patterns 211 and a plurality of first bridge patterns 212. The first sensing patterns 211 may be spaced apart from each other in the second direction DR2. The first bridge patterns 212 may extend in the second direction DR2, and may be electrically connected to the first sensing patterns 211 through a first contact CNa1. An example in which two first sensing patterns 211 that are adjacent to each other are electrically connected to each other by two first bridge patterns 212 is illustrated in FIGS. 12A and 12B, but the present disclosure is not particularly limited thereto. For example, two first sensing patterns 211 that are adjacent to each other may be electrically connected to each other by one first bridge pattern 212, or may be electrically connected to each other by three or more first bridge patterns 212.

The first sensing patterns 211 adjacent to each other in the second direction DR2 may be spaced apart from each other, with the second electrode 220 interposed therebetween. In an embodiment of the present disclosure, the first sensing patterns 211 and the second electrode 220 may be included in a second conductive layer 204SUa, and the first bridge patterns 212 may be included in a first conductive layer 202SUa. The first bridge patterns 212 may be insulated from the second electrode 220 overlapping with the first bridge patterns 212, and may cross the second electrode 220 overlapping with the first bridge patterns 212.

Each of the pattern electrodes 230S may extend in the second direction DR2. The pattern electrode 230S may be included in the first conductive layer 202SUa. One or more holes may be defined in each of the pattern electrode 230S. One first bridge pattern 212 may be disposed in one hole. Accordingly, the first bridge pattern 212 may be electrically insulated from the pattern electrode 230S.

In an embodiment of the present disclosure, the first conductive layer 202SUa may further include first dummy patterns DMP1, and the second conductive layer 204SUa may further include second dummy patterns DMP2. Each of the first dummy patterns DMP1 and the second dummy patterns DMP2 may be floated, or may be electrically floated. Each of the first dummy patterns DMP1 and the second dummy patterns DMP2 may be divided into a plurality of conductive patterns. For example, one first dummy pattern DMP1 may include a plurality of floating dummy patterns that are spaced apart (e.g., that are separated) from each other, or electrically separated from each other.

Referring to FIG. 10C, an area of the pattern electrode 230S and an area of the first sensing pattern 211 may be adjusted. For example, a location of a boundary between the pattern electrode 230S and the first dummy patterns DMP1 and a location of a boundary between the first sensing pattern 211 and the second dummy patterns DMP2 may be adjusted. In this case, as the area by which the pattern electrode 230S and the first sensing pattern 211 overlap with each other is adjusted, a capacitance magnitude of a coupling capacitor C-CP between the pattern electrode 230S and the first sensing pattern 211 may be adjusted.

Figure 11:
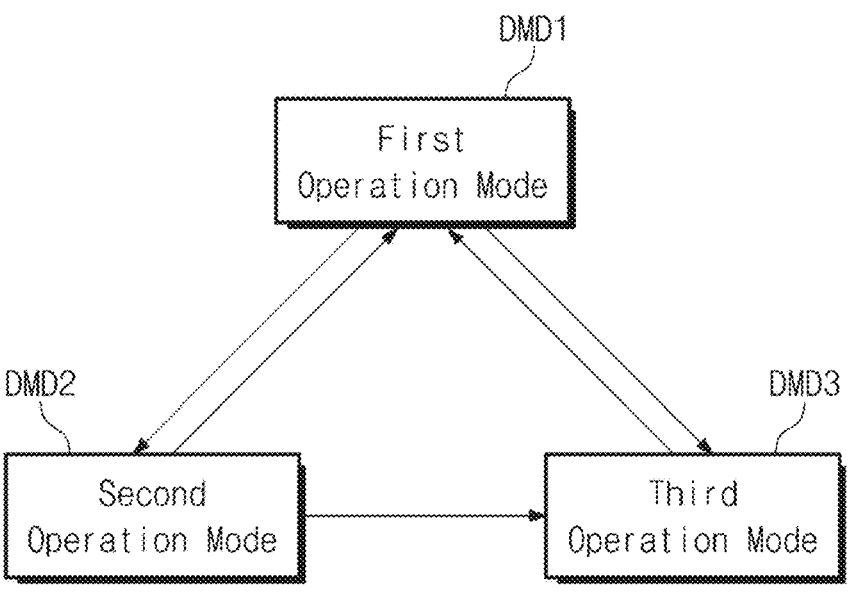
FIG. 11 is a diagram illustrating an operation of a sensor driving unit according to an embodiment of the present disclosure.

FIG. 11 is a diagram illustrating an operation of a sensor driving unit according to an embodiment of the present disclosure.

Referring to FIGS. 5 and 11, the sensor driving unit 200C may selectively operate in one of a first operation mode DMD1, a second operation mode DMD2, and a third operation mode DMD3.

The first operation mode DMD1 may be referred to as a "touch and pen standby mode", the second operation mode DMD2 may be referred to as a "touch enable and pen standby mode", and the third operation mode DMD3 may be referred to as a "pen enable mode". The first operation mode DMD1 may be a mode for waiting for the first input 2000 and the second input 3000. The second operation mode DMD2 may be a mode for sensing the first input 2000 and waiting for the second input 3000. The third operation mode DMD3 may be a mode for sensing the second input 3000.

In an embodiment of the present disclosure, the sensor driving unit 200C may be first driven in the first operation mode DMD1. When the first input 2000 is sensed in the first operation mode DMD1, the sensor driving unit 200C may switch (e.g., may change) to the second operation mode DMD2. As another example, when the second input 3000 is sensed in the first operation mode DMD1, the sensor driving unit 200C may switch (e.g., may change) to the third operation mode DMD3.

In an embodiment of the present disclosure, when the second input 3000 is sensed in the second operation mode DMD2, the sensor driving unit 200C may switch (e.g., may change) to the third operation mode DMD3. When the first input 2000 is released (e.g., is not sensed) in the second operation mode DMD2, the sensor driving unit 200C may switch to the first operation mode DMD1. When the second input 3000 is released (e.g., is not sensed) in the third operation mode DMD3, the sensor driving unit 200C may switch to the first operation mode DMD1.

Figure 12:
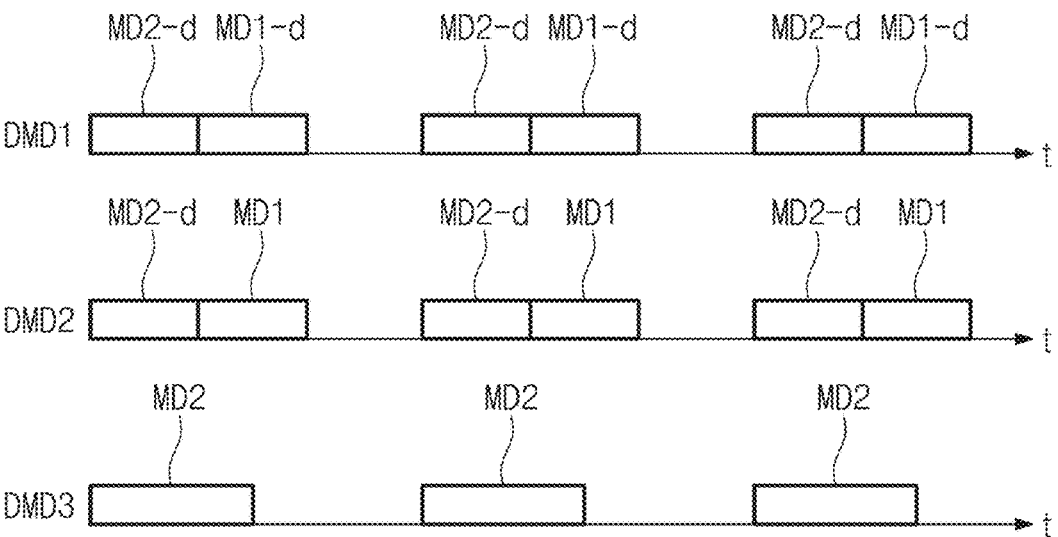
FIG. 12 is a diagram illustrating an operation of a sensor driving unit according to an embodiment of the present disclosure.

FIG. 12 is a diagram illustrating an operation of a sensor driving unit according to an embodiment of the present disclosure.

Referring to FIGS. 5, 7, 11, and 12, operations in the first to third operating modes DMD1, DMD2, and DMD3 are illustrated as an example over time (t).

In the first operation mode DMD1, the sensor driving unit 200C may be repeatedly driven in a second mode MD2-d and a first mode MD1-d. During the second mode MD2-d, the sensor layer 200 may be scanned and driven to detect the second input 3000. During the first mode MD1-*d*, the sensor layer 200 may be scanned and driven to detect the first input 2000. An example in which the sensor driving unit 200C operates in the first mode MD1-*d* immediately after (e.g., to be continuous to) the second mode MD2-*d* is illustrated in FIG. 12, but the order of the first mode MD1-*d* and the second mode MD2-*d* is not limited thereto.

In the second operation mode DMD2, the sensor driving unit 200C may be repeatedly driven in the second mode MD2-*d* and a first mode MD1. During the second mode MD2-*d*, the sensor layer 200 may be scanned and driven to detect the second input 3000. During the first mode MD1, the sensor layer 200 may be scanned and driven to detect coordinates of the first input 2000.

In the third operation mode DMD3, the sensor driving unit 200C may be driven in a second mode MD2. During the second mode MD2, the sensor layer 200 may be scanned and driven to detect coordinates of the second input 3000. In the third operation mode DMD3, the sensor driving unit 200C may not operate in the first mode MD1-*d* or MD1 until the second input 3000 is released (e.g., is not sensed).

Figure 13:
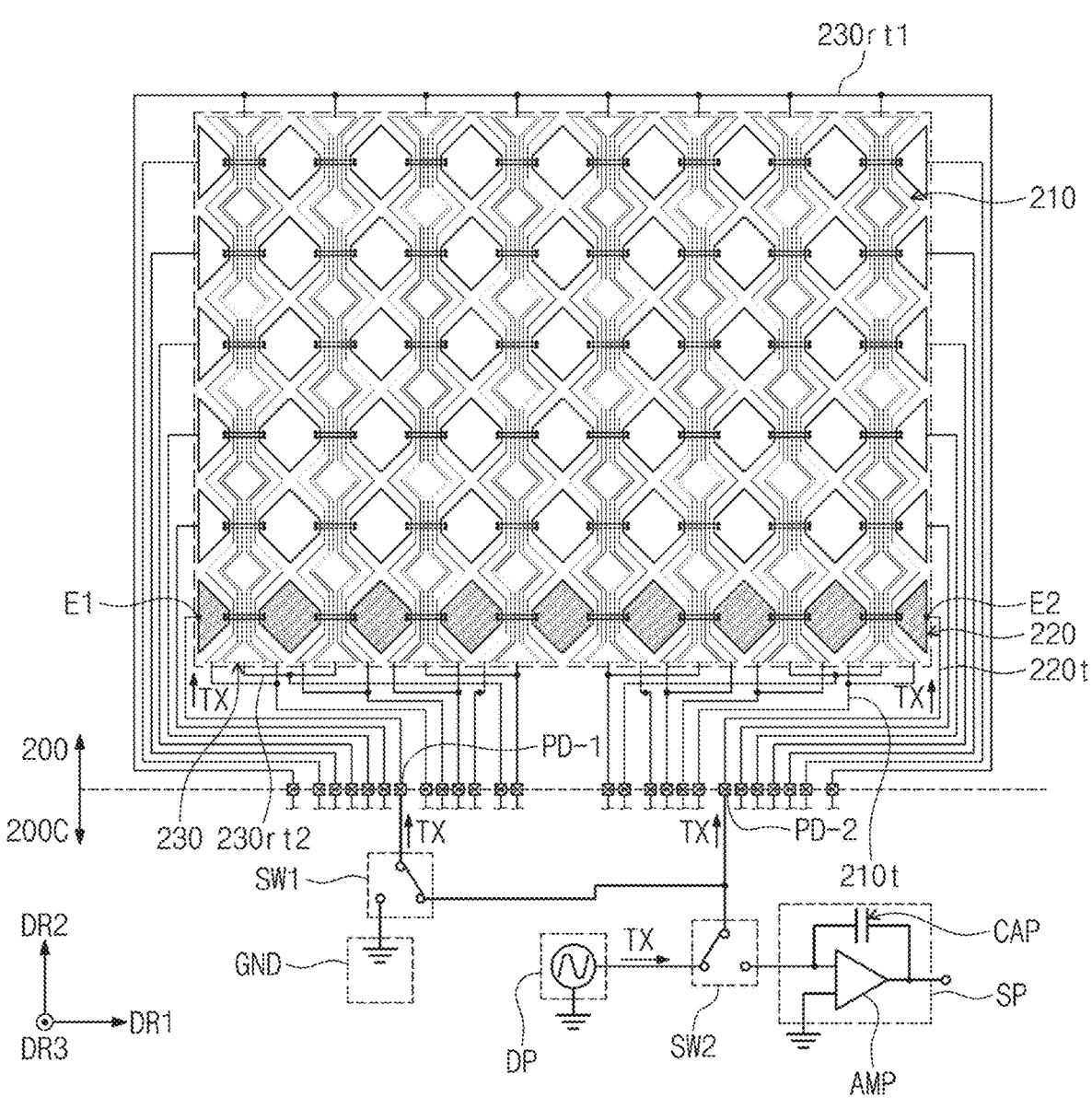
FIG. 13 illustrates a first mode of a sensor layer and a sensor driving unit according to an embodiment of the present disclosure.
Figure 14A:
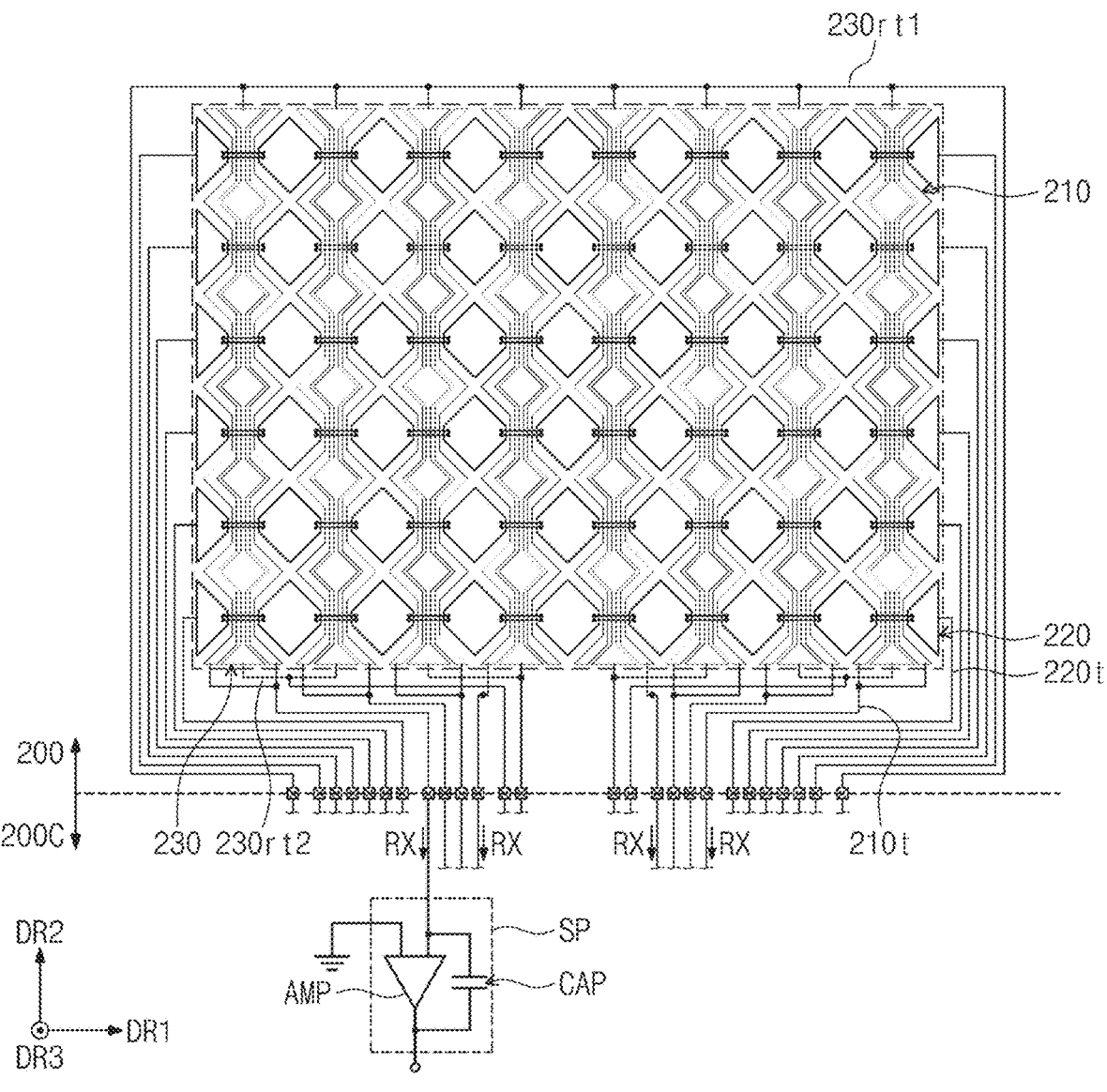
FIG. 14A illustrates a first mode of a sensor layer and a sensor driving unit according to an embodiment of the present disclosure.

FIG. 13 illustrates a first mode of a sensor layer and a sensor driving unit according to an embodiment of the present disclosure. FIG. 14A illustrates a first mode of a sensor layer and a sensor driving unit according to an embodiment of the present disclosure. In FIGS. 13 and 14A, the components that are the same or substantially the same as (or similar to) those described above with reference to FIG. 7 are denoted by the same reference numerals/signs, and thus, redundant description thereof may not be repeated.

Referring to FIGS. 12, 13, and 14A, each of the first mode MD1-*d* and the first mode MD1 may be a mode for sensing a touch.

The first mode MD1-*d* and the first mode MD1 may include a mutual capacitance detection mode. However, the present disclosure is not limited thereto. The first mode MD1-*d* and the first mode MD1 according to an embodiment of the present disclosure may further include a magnetic capacitance detection mode. The sensor driving unit 200C may include a driving unit (e.g., a driver or a driving circuit) DP, a plurality of sensing units (e.g., a plurality of sensors or a plurality of sensing circuits) SP, a ground (e.g., a ground voltage) GND, a plurality of pad parts, a first switch SW1, and a second switch SW2.

The driving unit DP may generate signals to be provided to the sensor layer 200. The driving unit DP may generate a driving signal (e.g., an output signal) TX.

Each of the plurality of sensing units SP may be implemented with an analog front-end. Each of the plurality of sensing units SP may include an amplifier AMP and a capacitor CAP.

A first input terminal of the amplifier AMP may be connected to the second switch SW2. A second input terminal of the amplifier AMP may be connected to a voltage providing unit (e.g., a voltage provider or a voltage providing circuit) that provides a voltage with a suitable voltage level (e.g., a given or predetermined voltage level). A voltage having a voltage level corresponding to ground GND may be provided to the voltage provider. The ground GND connected to the second input terminal may be the same or substantially the same as the ground GND illustrated in FIG. 13. However, the present disclosure is not limited thereto. A component that is connected to the second input terminal of the amplifier AMP according to an embodiment of the present disclosure is not limited thereto. For example, a voltage (e.g., a given or predetermined voltage) may be provided to the second input terminal of the amplifier AMP.

A signal output through an output terminal of the amplifier AMP may be filtered. Afterwards, the filtered signal may be converted into a digital signal.

The capacitor CAP may be connected between the first input terminal and the output terminal of the amplifier AMP.

The plurality of pad parts may include first pad parts respectively connected to the plurality of first pads PD1 (e.g., refer to FIG. 7), second pad parts respectively connected to the plurality of second pads PD2, and third pad parts respectively connected to the plurality of third pads PD3.

The second pad parts may include a (2-1)-th pad part PD-1 and a (2-2)-th pad part PD-2. The (2-1)-th pad part PD-1 and the (2-2)-th pad part PD-2 may be respectively connected to two corresponding second pads PD2 from among the plurality of second pads PD2 (e.g., refer to FIG. 7).

The (2-1)-th pad part PD-1 may be electrically connected to a first end E1 of one second electrode 220 from among the plurality of second electrodes 220. The (2-1)-th pad part PD-1, the second pad PD2 (e.g., refer to FIG. 7), the second trace line 220*t*, and the first end E1 may be connected to each other.

The (2-2)-th pad part PD-2 may be electrically connected to a second end E2 of the one second electrode 220 from among the plurality of second electrodes 220. The (2-2)-th pad part PD-2, the second pad PD2 (e.g., refer to FIG. 7), the second trace line 220*t*, and the second end E2 may be connected to each other.

The first switch SW1 may be connected to the (2-1)-th pad part PD-1. The first switch SW1 may provide a connection between the (2-1)-th pad part PD-2 and the voltage providing unit for providing a voltage with the given voltage level, or a connection between the (2-1)-th pad part PD-1 and the (2-2)-th pad part PD-2. The voltage providing unit may be the ground GND.

The second switch SW2 may be connected to the (2-2)-th pad part PD-2. The second switch SW2 may provide a connection between the (2-2)-th pad part PD-2 and the driving unit DP, or a connection between the (2-2)-th pad part PD-2 and the sensing unit SP.

In the first mode MD1-*d* and the first mode MD1, the sensor driving unit 200C may electrically connect the first end E1 and the second end E2 to each other of each of the plurality of second electrodes 220. The first switch SW1 may be connected to the (2-1)-th pad part PD-1 and the (2-2)-th pad part PD-2, and the second switch SW2 may be connected to the (2-2)-th pad part PD-2 and the driving unit DP.

In the sensor layer 200, a first end of the second trace line 220*t* connected to the first end E1 and a first end of the second trace line 220*t* connected to the second end E2 may not be connected to each other.

The first end of the second trace line 220*t* connected to the first end E1 and the first end of the second trace line 220*t* connected to the second end E2 may be connected to each other by the first switch SW1 and the second end E2 in the sensor driving unit 200C.

According to some embodiments of the present disclosure, each of the plurality of second electrodes 220 may be double routed within the sensor driving unit 200C by the first switch SW1 and the second switch SW2. The driving signal TX may be transferred to opposite ends of each of the plurality of second electrodes 220. An intensity of the driving signal TX may be prevented or substantially prevented from being reduced. Accordingly, a reliability of the sensing may be improved.

According to some embodiments of the present disclosure, the sensor driving unit 200C may more easily drive the sensor layer 200 by using the first switch SW1 and the second switch SW2, depending on the mode. Accordingly, the electronic device 1000 having an improved reliability may be provided.

An example in which the driving signal TX is provided to one second electrode 220 is illustrated in FIG. 13. For convenience of illustration, in FIG. 13, only one second electrode 220 to which the driving signal TX is provided is shown as being hatched.

The sensor driving unit 200C may transmit the driving signal TX sequentially to the plurality of second electrodes 220.

The first pad parts connected to the plurality of first pads PD1 (e.g., refer to FIG. 7) from among the plurality of pad parts may be respectively connected to the plurality of sensing units SP. Each of the plurality of sensing units SP may be implemented to operation in a single-ended mode.

Each of the plurality of sensing units SP may include the amplifier AMP, and the capacitor CAP connected to the amplifier AMP. The first input terminal of the amplifier AMP may be connected to a corresponding one of the first pad parts. The second input terminal of the amplifier AMP may be connected to ground. The ground connected to the second input terminal may be the same or substantially the same as the ground GND. A signal output through an output terminal of the amplifier AMP may be filtered. Afterwards, the filtered signal may be converted into a digital signal.

Each of the plurality of sensing units SP may receive a receive signal RX from each of the plurality of first electrodes 210. The sensor driving unit 200C may detect coordinates of the first input 2000 by using the receive signal RX. For example, the sensor driving unit 200C may sense a change in a mutual capacitance between the first electrodes 210 and the second electrodes 220 based on the digital signal, and may calculate coordinates of the touch based on a sensing result.

However, the present disclosure is not limited thereto. In another embodiment of the present disclosure, the coordinates of the first input 2000 may be detected based on a signal obtained by amplifying a difference between the digital signal and a digital signal sensed from another first electrode 210 adjacent thereto. In the first mode MD1-d and the first mode MD1, pad parts connected to the plurality of first pads PD1 (e.g., refer to FIG. 7) from among the plurality of pad parts may be connected to the ground GND. All of the auxiliary electrodes 230 may be electrically connected to the ground GND. Accordingly, a touch noise may be prevented or substantially prevented from being introduced through the plurality of auxiliary electrodes 230.

In a comparative example, for the sensing of the pen PN, a sensor layer may further include additional electrodes that extend in the same direction as that of the plurality of second electrodes 220, and each of the additional electrodes may form a coupling capacitor with each of the plurality of second electrodes 220. In this case, when compared to the shape where the additional electrodes are omitted, the area of each of the plurality of second electrodes 220 may be reduced. Also, as parasitic capacitances may be formed by the additional electrodes and any other electrodes adjacent thereto, a decrease in a touch bandwidth may be caused. However, according to some embodiments of the present disclosure, the sensor driving unit 200C may include the first switch SW1 and the second switch SW2. In this case, even though the additional electrodes may be omitted, the driving operations of the first switch SW1 and the second switch SW2 may make the sensing of the pen PN easier. The area of each of the plurality of second electrodes 220 may become relatively large, and thus, the resistance of each of the plurality of second electrodes 220 may be decreased. Accordingly, a load of each of the plurality of second electrodes 220 may be decreased. A touch bandwidth of a signal that the sensor driving unit 200C senses may be improved. Accordingly, the electronic device 1000 having an improved touch reliability may be provided.

Figure 14B:
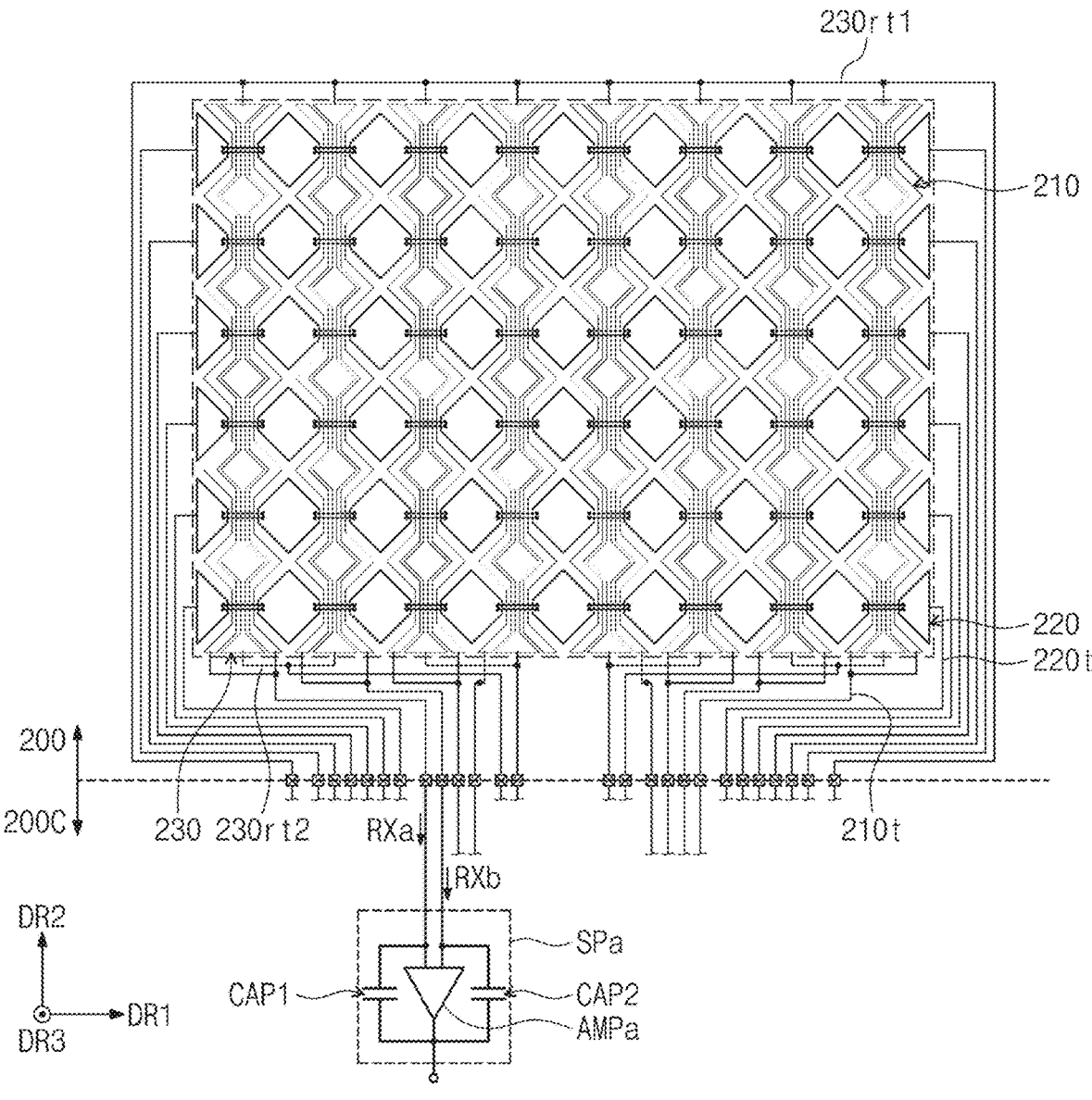
FIG. 14B illustrates a first mode of a sensor layer and a sensor driving unit according to an embodiment of the present disclosure.

FIG. 14B illustrates a first mode of a sensor layer and a sensor driving unit according to an embodiment of the present disclosure.

Referring to FIGS. 12, 13, and 14B, first pad parts connected to the plurality of first pads PD1 (e.g., refer to FIG. 7) from among the plurality of pad parts may be respectively connected to a plurality of sensing units (e.g., a plurality of sensors or a plurality of sensing circuits) SPa. The plurality of sensing units SPa may be implemented to operation in a differential mode.

Each of the plurality of sensing units SPa may include an amplifier AMPa and a plurality of capacitors CAP1 and CAP2. A first input terminal of the amplifier AMPa may be connected to a corresponding one of the first pad parts. A second input terminal of the amplifier AMPa may be connected to another one of the first pad parts. A signal output through an output terminal of the amplifier AMPa may be filtered. Afterwards, the filtered signal may be converted into a digital signal.

The first capacitor CAP1 may be connected between the first input terminal and the output terminal. The second capacitor CAP2 may be connected between the second input terminal and the output terminal.

Each of the plurality of sensing units SPa may receive a first receive signal RXa from one of the plurality of first electrodes 210, and may receive a second receive signal RXb from another of the plurality of first electrodes 210. Each of the plurality of sensing units SPa may receive the receive signals RXa and RXb from one of the plurality of first electrodes 210 and another of the plurality of first electrodes 210, which is adjacent thereto, and may amplify a difference between the receive signals RXa and RXb.

The sensor driving unit 200C may detect coordinates of the first input 2000 (e.g., refer to FIG. 5) by using the first receive signal RXa and the second receive signal RXb. For example, the sensor driving unit 200C may sense a change in a mutual capacitance between the first electrodes 210 and the second electrodes 220, and may calculate coordinates of the touch based on a sensing result.

Figure 15:
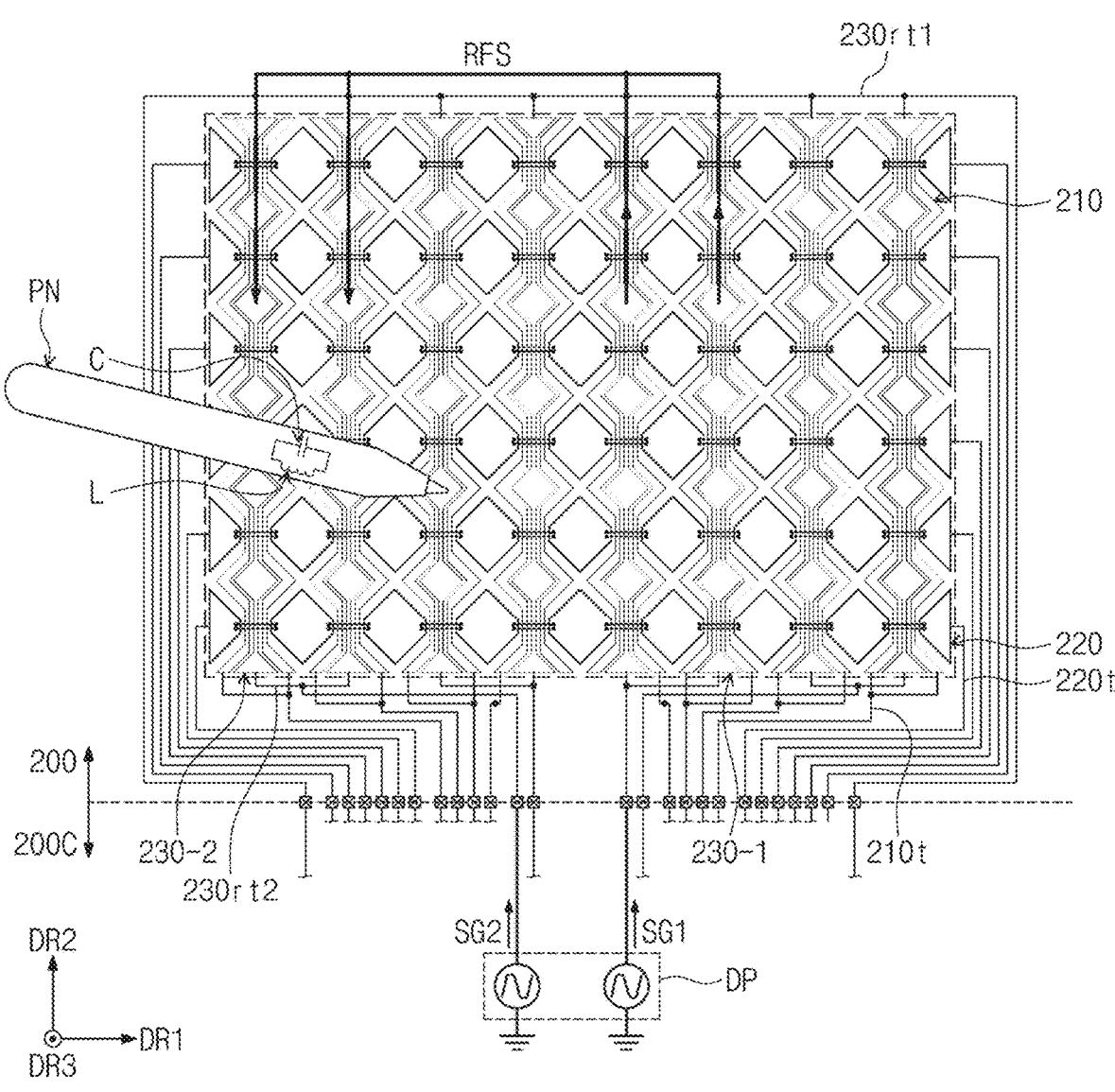
FIG. 15 illustrates a second mode of a sensor layer and a sensor driving unit according to an embodiment of the present disclosure.
Figure 16:
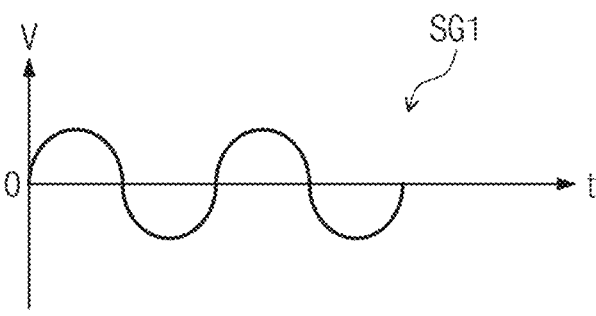
FIG. 16 illustrates graphs of waveforms of a first signal and a second signal according to an embodiment of the present disclosure.
Figure 16:
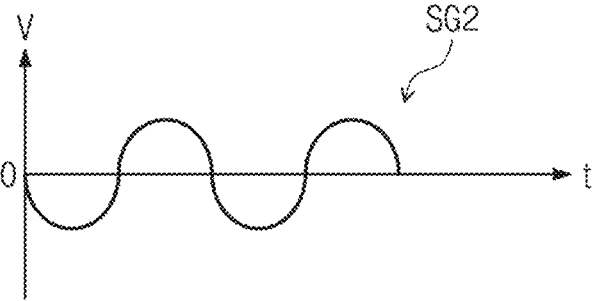

FIG. 15 illustrates a second mode of a sensor layer and a sensor driving unit according to an embodiment of the present disclosure. FIG. 16 illustrates graphs of waveforms of a first signal and a second signal according to an embodiment of the present disclosure.

Referring to FIGS. 5, 13, 15, and 16, the second modes MD2 and MD2-d may include a charging mode and a sensing mode.

In the charging mode, the sensor driving unit 200C may transmit charging signals SG1 and SG2 to the sensor layer 200.

The sensor driving unit 200C may include a driving unit (e.g., a driver or a driving circuit) DP and the plurality of pad parts.

The driving unit DP may generate the charging signals SG1 and SG2. The charging signals SG1 and SG2 may include a first charging signal SG1 and a second charging signal SG2. A phase of the second charging signal SG2 may be opposite to a phase of the first charging signal SG1. For example, each of the first charging signal SG1 and the second charging signal SG2 may be a sinusoidal signal. However, the present disclosure is not limited thereto. Each of the first charging signal SG1 and the second charging signal SG2 may be a square wave signal.

The plurality of pad parts may include third pad parts connected to the plurality of third pads PD3 (e.g., refer to FIG. 7). The first charging signal SG1 may be applied to at least one pad part from among the third pad parts. The sensor driving unit 200C may transmit the first charging signal SG1 to one auxiliary electrode 230-1 from among the plurality of auxiliary electrodes 230.

The second charging signal SG2 may be applied to at least another pad part from among the third pad parts. The sensor driving unit 200C may transmit the second sensing signal SG2 to another auxiliary electrode 230-2 from among the plurality of auxiliary electrodes 230.

The one auxiliary electrode 230-1 and the another auxiliary electrode 230-2 may be spaced apart from each other, with at least one of the others of the plurality of auxiliary electrodes 230 interposed therebetween. The sensor driving unit 200C may control a size of a charging loop by adjusting a distance (e.g., a space) between the one auxiliary electrode 230-1 and the another auxiliary electrode 230-2.

When the first charging signal SG1 and the second charging signal SG2 have an opposite-phase relationship with each other, noise caused by the first charging signal SG1 in the display layer 100 may be canceled out with noise caused by the second charging signal SG2. Accordingly, a flicker phenomenon may not occur in the display layer 100. As such, a display quality of the display layer 100 may be improved.

As the first charging signal SG1 and the second charging signal SG2 are applied to at least two third pads PD3 (e.g., refer to FIG. 7), there may be formed a current path in which a current RFS flows to at least one third pad through at least another third pad. Also, because the first charging signal SG1 and the second charging signal SG2 have an opposite-phase relationship with each other, the direction of the current RFS may periodically change.

The current path may be in the shape of a coil. In this case, the current path may be referred to as a "single direct loop pathway". Accordingly, in the charging mode, the resonant circuit of the pen PN may be charged by the current path.

The charging mode may include a searching charging mode and a tracking charging mode.

In the searching charging mode, because there may be a state where a location of the pen PN is not sensed, the first charging signal SG1 or the second charging signal SG2 may be provided sequentially to all of the channels included in the sensor layer 200. For example, the first charging signal SG1 or the second charging signal SG2 may be scanned sequentially in the first direction DR1. In other words, the entire active area 200A (e.g., refer to FIG. 7) of the sensor layer 200 may be scanned in the searching charging driving mode.

When the pen PN is sensed in the searching charging mode, the sensor layer 200 may be driven in a tracking charging driving mode. For example, in the tracking charging driving mode, the sensor driving unit 200C may output the first charging signal SG1 and the second charging signal SG2 to an area overlapping with a point where the pen PN is sensed, instead of the entire sensor layer 200.

Accordingly, after the location of the pen PN is sensed, the channels corresponding to a location of the pen PN in an immediately previous frame and are driven in the charging driving mode may be limited. Accordingly, channels that overlap with an area where a pen is not located may not be driven in the charging driving mode. Accordingly, the efficiency of the charging driving may be improved.

Figure 17:
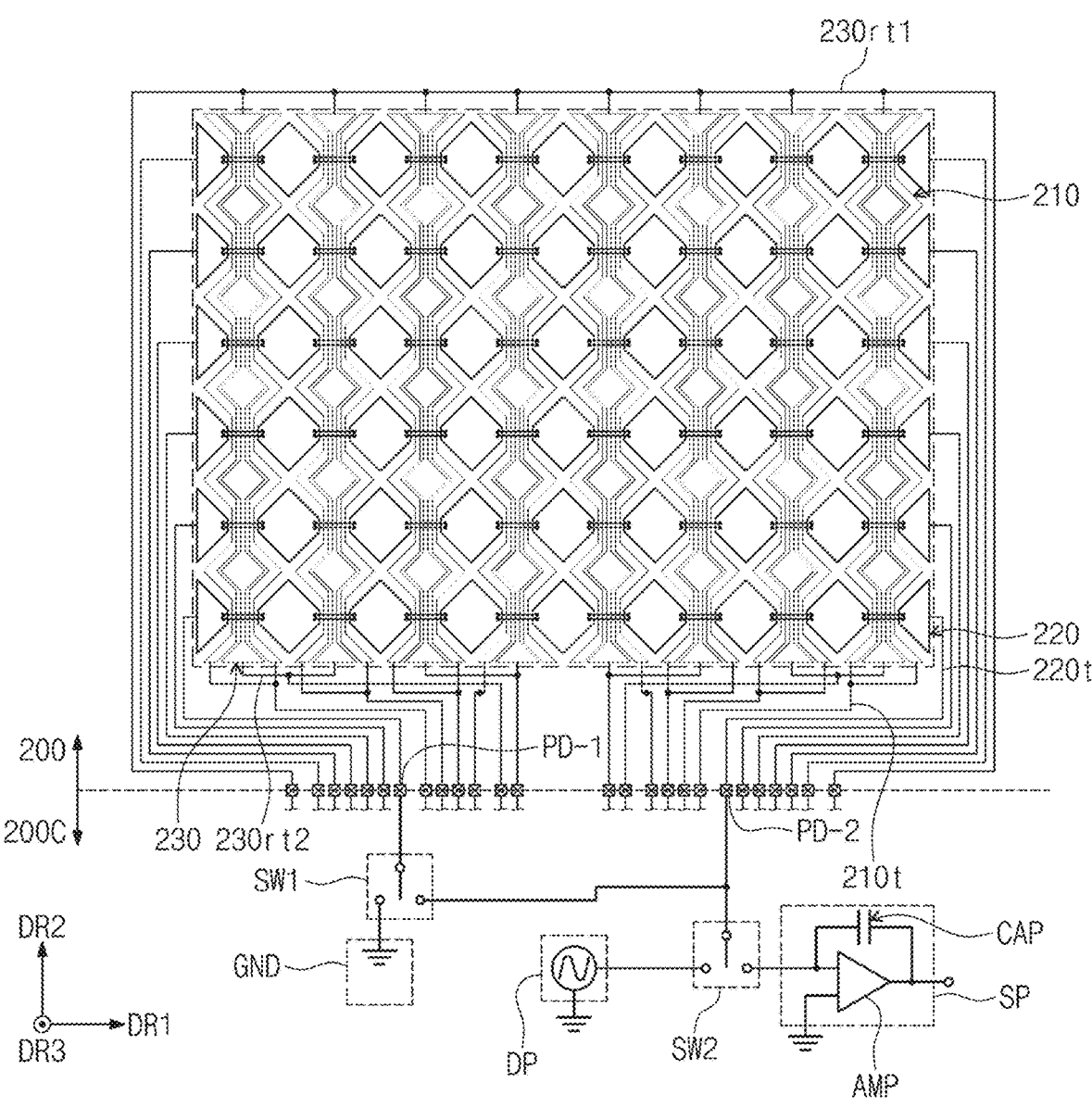
FIG. 17 illustrates a second mode of a sensor layer and a sensor driving unit according to an embodiment of the present disclosure.

FIG. 17 illustrates a second mode of a sensor layer and a sensor driving unit according to an embodiment of the present disclosure.

Referring to FIGS. 5, 13, 15, and 17, in the charging mode, the first switch SW1 connected to the (2-1)-th pad part PD-1 of the sensor driving unit 200C may not be connected to the ground GND and the (2-2)-th pad part PD-2. The second switch SW2 connected to the (2-2)-th pad part PD-2 may not be connected to the driving unit DP and the sensing unit SP.

The plurality of first electrodes 210 and the plurality of second electrodes 220 may be electrically floated. Accordingly, the current RFS may not flow to the plurality of first electrodes 210 and the plurality of second electrodes 220.

Figure 18:
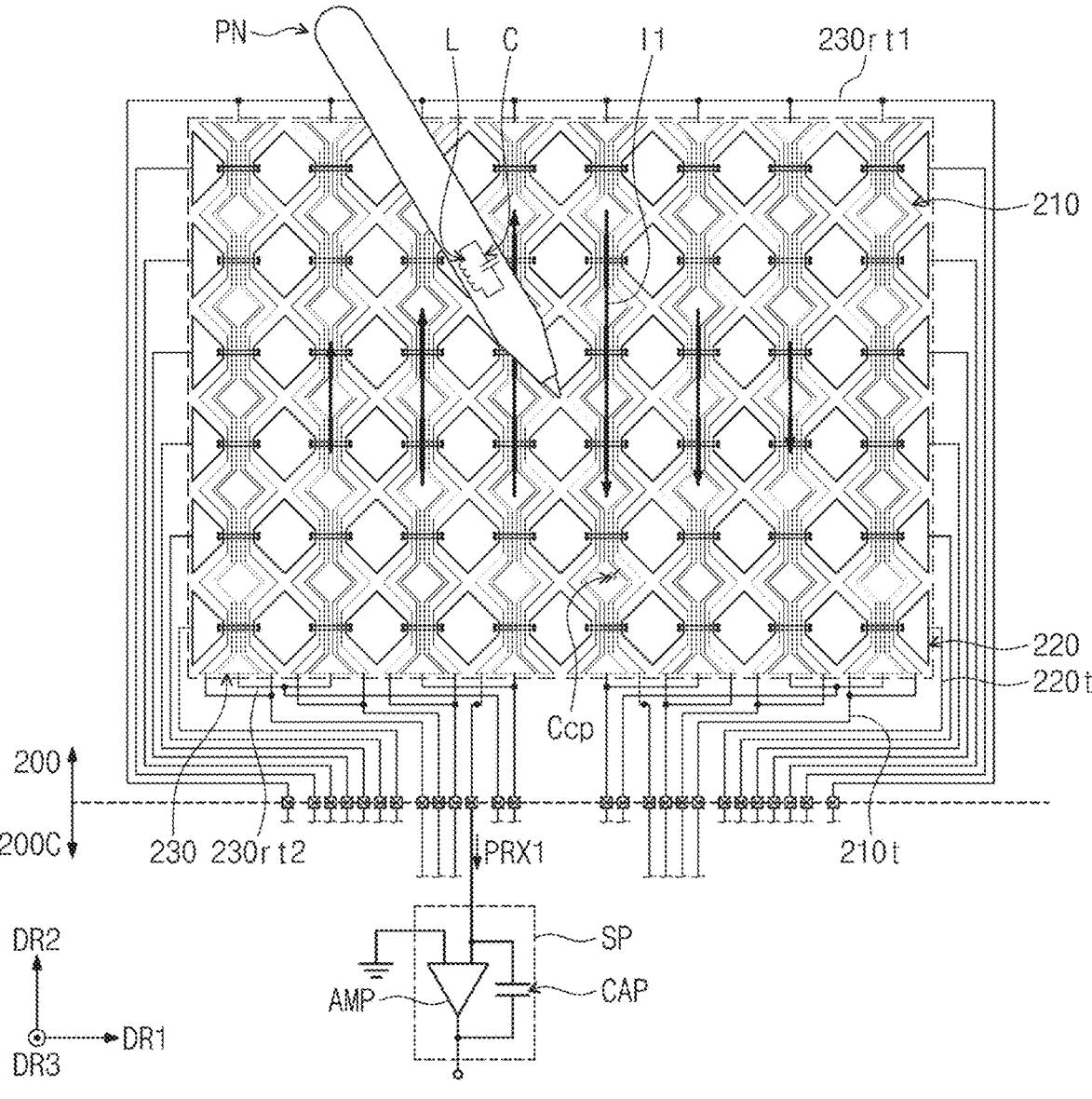
FIG. 18 illustrates a second mode of a sensor layer and a sensor driving unit according to an embodiment of the present disclosure.
Figure 19A:
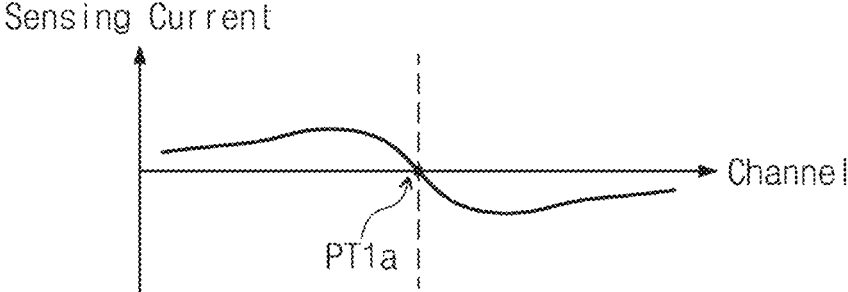
FIG. 19A is a diagram illustrating a current sensed from first channels.
Figure 19B:
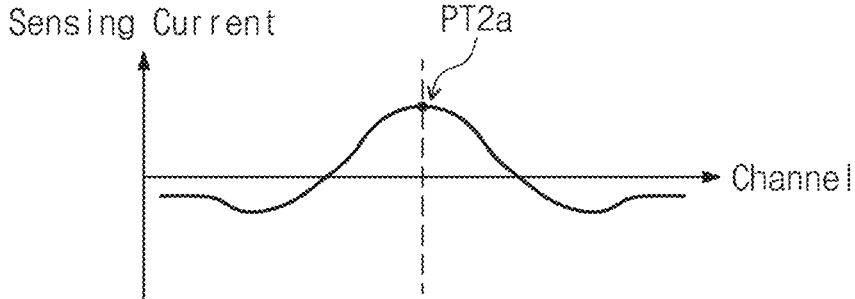
FIG. 19B is a diagram illustrating a current obtained from a differential pair of first channels.

FIG. 18 illustrates a second mode of a sensor layer and a sensor driving unit according to an embodiment of the present disclosure. FIG. 19A is a diagram illustrating a current sensed from first channels. FIG. 19B is a diagram illustrating a current obtained from a differential pair of first channels. In FIG. 18, the components that are the same or substantially the same as (or similar to) those described above with reference to FIG. 14A are denoted by the same reference signs/numerals, and thus, redundant description thereof may not be repeated.

Referring to FIGS. 5, 12, and 18 to 19B, in the sensing mode of the second mode MD2, a current may flow to a coil of an inductor "L" while the RLC resonant circuit of the pen PN discharges the charged charges. A magnetic field may be formed by the current. The pen PN may emit the magnetic field having a resonant frequency.

First induced currents I1 may be generated on the plurality of first electrodes 210 and the plurality of auxiliary electrodes 230 by the magnetic field provided from the pen PN. The first induced current I1 may be formed in a direction facing away from (e.g., opposite to) a direction in which the current flows.

In a plan view, the first induced currents I1 may be formed on the first electrodes 210 and the auxiliary electrodes 230, which are located on the left side with respect to the pen PN, in the second direction DR2. The first induced currents I1 may be formed on the first electrodes 210 and the auxiliary electrodes 230, which are located on the right side with respect to the pen PN, in the direction facing away from (e.g., opposite to) the second direction DR2.

As a distance from the pen PN increases, the magnitude of the first induced current I1 may decrease. When the pen PN is provided in a direction parallel to or substantially parallel to the third direction DR3 in a state where the pen PN is not tilted, the magnitude of the first induced current I1 may be horizontally symmetric or substantially horizontally symmetric with respect to the location of the pen PN.

The coupling capacitors Ccp may be respectively formed between the plurality of first electrodes 210 and the plurality of auxiliary electrodes 230. The first induced currents I1 formed on the plurality of auxiliary electrodes 230 may be transferred to the plurality of first electrodes 210 through the coupling capacitors Ccp, respectively. The sensor driving unit 200C may receive a first sensing signal PRX1 based on the first induced current I1.

In the sensing mode, the sensor driving unit 200C may receive the first sensing signal PRX1 transferred by the capacitive coupling of the coupling capacitors Ccp between the plurality of first electrodes 210 and the plurality of auxiliary electrodes 230.

The first pad parts connected to the plurality of first pads PD1 (e.g., refer to FIG. 7) from among the plurality of pad parts may be respectively connected to the plurality of sensing units SP.

Each of the plurality of sensing units SP may receive the first sensing signal PRX1. The sensor driving unit 200C may calculate a sensing current for each channel or for a differential channel by using the first sensing signal PRX1. The sensing current may correspond to the first sensing signal PRX1. This will be described in more detail below.

In the pen sensing mode, a first end of each of the plurality of auxiliary electrodes 230 may be floated. A compensation for the first sensing signal PRX1 may be maximized or increased by the coupling between the plurality of first electrodes 210 and the plurality of auxiliary electrodes 230. Also, a second end of each of the plurality of auxiliary electrodes 230 may be grounded or floated. Accordingly, the first induced currents 11 of the plurality of auxiliary electrodes 230 may be sufficiently transferred to the plurality of first electrodes 210.

Each of the plurality of first electrodes 210 may be referred to as a "first channel". Directions of the first induced currents 11 that are sensed from first channels spaced apart from each other with a pen-located portion interposed therebetween may be different. A direction of currents flowing to first channels located on the left side with respect to the location of the pen PN may be different from a direction of currents flowing to first channels located on the right side with respect to the location of the pen PN. Accordingly, the sensor driving unit 200C may sense currents flowing in different directions from each other with respect to the location of the pen PN. The sensor driving unit 200C may calculate coordinates based on a zero crossing value PT1$a$ of a sensing current graph for each channel.

As another example, the sensor driving unit 200C may sense currents by performing differential sensing for channels that are adjacent to each other from among the plurality of first channels, or for channels that are spaced apart from each other from among the plurality of first channels. For example, the sensing current may be obtained by performing differential sensing for an N-th first electrode and an (N+2)-th first electrode, where N is a natural number, but the present disclosure is not limited thereto. According to an embodiment of the present disclosure, the number of first electrodes targeted for differential sensing is not limited thereto. For example, an N-th first electrode and an (N+3)-th first electrode may be targeted for differential sensing, where N is a natural number. The sensor driving unit 200C may calculate coordinates based on a peak value PT2$a$ of a sensing current graph for each differential channel.

Figure 20:
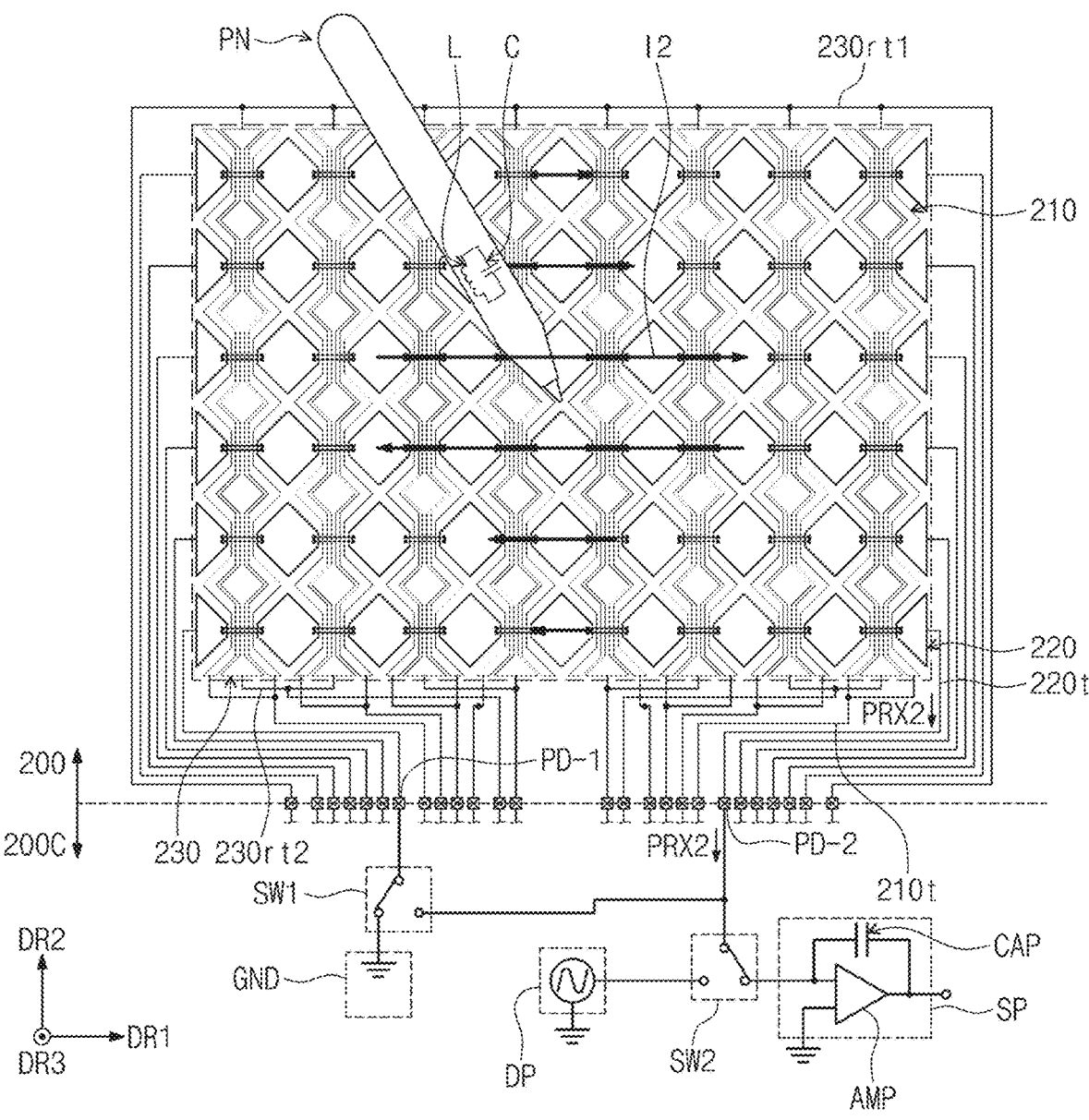
FIG. 20 illustrates a second mode of a sensor layer and a sensor driving unit according to an embodiment of the present disclosure.
Figure 21A:
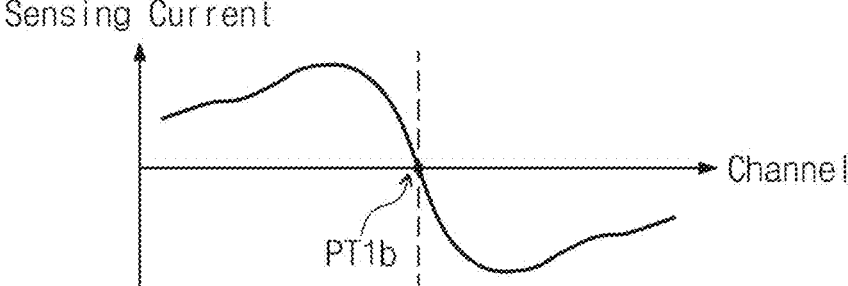
FIG. 21A is a diagram illustrating a current sensed from second channels.
Figure 21B:
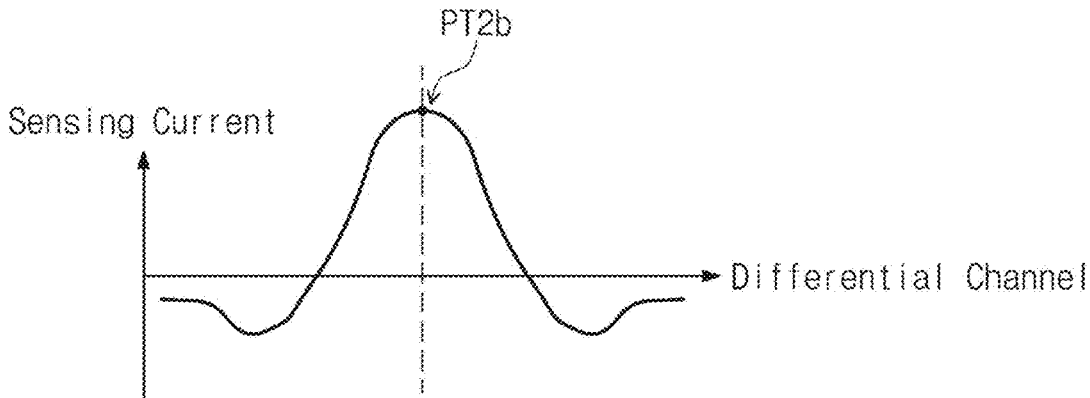
FIG. 21B is a diagram illustrating a current obtained from a differential pair of second channels.

FIG. 20 illustrates a second mode of a sensor layer and a sensor driving unit according to an embodiment of the present disclosure. FIG. 21A is a diagram illustrating a current sensed from second channels. FIG. 21B is a diagram illustrating a current obtained from a differential pair of second channels. In FIG. 20, the components that are the same or substantially the same as (or similar to) those described above with reference to FIG. 13 are denoted by the same reference numerals/signs, and thus, redundant description thereof may not be repeated.

Referring to FIGS. 12 and 20 to 21B, in the sensing modes of the second modes MD2 and MD2-$d$, a current may flow to the coil of the inductor "L" while the RLC resonant circuit of the pen PN discharges the charged charges. A magnetic field may be formed by the current. The pen PN may emit the magnetic field having a resonant frequency.

A second induced current 12 may be generated on the plurality of second electrodes 220 by the magnetic field provided from the pen PN. The second induced current 12 may be formed in a direction facing away from (e.g., opposite to) a direction in which the current flows.

In a plan view, the second induced currents 12 may be formed on the second electrodes 220, which are located on the upper side with respect to the pen PN, in the first direction DR1. The second induced currents 12 may be formed on the second electrodes 220, which are located on the lower side with respect to the pen PN, in the direction facing away from (e.g., opposite to) the first direction DR1.

As a distance from the pen PN increases, the magnitude of the second induced current 12 may decrease. When the pen PN is provided in a direction parallel to or substantially parallel to the third direction DR3 in a state where the pen PN is not tilted, the magnitude of the second induced current 12 may be vertically symmetric or substantially vertically symmetric with respect to the location of the pen PN.

The second induced currents 12 formed on the plurality of second electrodes 220 may be transferred to the sensor driving unit 200C. The sensor driving unit 200C may receive a second sensing signal PRX2 based on the second induced current 12.

In the sensing mode, the sensor driving unit 200C may directly receive a current of the second sensing signal PRX2.

The sensor driving unit 200C may receive the second sensing signal PRX2 based on the second induced current 12. The sensor driving unit 200C may detect coordinates of the pen PN based on the first sensing signal PRX1 (e.g., refer to FIG. 18) and/or the second sensing signal PRX2.

In the sensing mode of each of the second mode MD2-$d$ and the second mode MD2, the first switch SW1 may be connected to the (2-1)-th pad part PD-1 and the ground GND, and the second switch SW2 may be connected to the (2-2)-th pad part PD-2 and the sensing unit SP.

The sensing unit SP may receive the second sensing signal PRX2. The sensor driving unit 200C may calculate a sensing current for each channel or for a differential channel by using the second sensing signal PRX2. The sensing current may correspond to the second sensing signal PRX2. This will be described in more detail below.

Each of the plurality of second electrodes 220 may be referred to as a "second channel". Directions of the second induced currents 12 that are sensed from second channels spaced apart from each other with a pen-located portion interposed therebetween may be different. A direction of currents flowing to second channels located on the upper side with respect to the location of the pen PN may be different from a direction of currents flowing to second channels located on the lower side with respect to the location of the pen PN. Accordingly, the sensor driving unit 200C may sense currents flowing in different directions from each other with respect to the location of the pen PN. The sensor driving unit 200C may calculate coordinates based on a zero crossing value PT1$b$ of a sensing current graph for each channel.

As another example, the sensor driving unit 200C may sense currents by performing differential sensing for channels that are adjacent to each other from among the plurality of second channels, or for channels that are spaced apart from each other from among the plurality of second channels. For example, the sensing current may be obtained by performing differential sensing for an N-th second electrode and an (N+2)-th second electrode, where N is a natural number, but the present disclosure is not limited thereto. According to an embodiment of the present disclosure, the number of second electrodes targeted for differential sensing is not limited thereto. For example, an N-th second electrode and an (N+3)-th second electrode may be targeted for differential sensing, where N is a natural number. The sensor driving unit 200C may calculate coordinates based on a peak value PT2b of a sensing current graph for each differential channel.

Referring to FIGS. 7, 18, and 20, in the sensing mode, the sensor driving unit 200C may receive the first sensing signal PRX1 transferred by the capacitive coupling of the coupling capacitors Ccp between the plurality of first electrodes 210 and the plurality of auxiliary electrodes 230. In other words, the first sensing signal PRX1 may be sensed by a cap-assisted loop structure of the plurality of first electrodes 210 and the plurality of auxiliary electrodes 230.

In the sensing mode, the sensor driving unit 200C may directly receive a current of the second sensing signal PRX2 from the plurality of second electrodes 220. In other words, the second sensing signal PRX2 may be sensed by a direct loop structure of the plurality of second electrodes 220.

Accordingly, the x-axis and y-axis coordinates of the pen PN may be respectively sensed by utilizing different loop structures.

The sensor layer 200 according to an embodiment of the present disclosure may have both the cap-assisted loop structure and the direct loop structure. For example, the minor axis having the first length W1 being relatively shorter may be formed by the plurality of first electrodes 210 and the plurality of auxiliary electrodes 230 in the cap-assisted loop structure, and the major axis having the second length W2 being relatively longer may be formed by the plurality of second electrodes 220 in the direct loop structure.

The intensity of the second sensing signal PRX2 sensed from the direct loop structure may be different from the intensity of the first sensing signal PRX1 sensed from the cap-assisted loop structure.

According to the present disclosure, in the direct loop structure, because the sensor driving unit 200C directly receives the second sensing signal PRX2 from each of the plurality of second electrodes 220, the intensity of the second sensing signal PRX2 may be greater than the intensity of the first sensing signal PRX1. Compared to a case where all sensing electrodes of a sensor layer are implemented in the cap-assisted loop structure, a pen sensing-bandwidth of the sensor layer 200 may be improved. Accordingly, the electronic device 1000 (e.g., refer to FIG. 1A) having an improved pen sensing reliability may be provided.

In a comparative example, assuming that both the minor axis and the major axis are formed in the direct loop structure, because the number of switches SW1 and SW2 that the sensor driving unit 200C includes is increased by as much as two times or more, the number of pads of a ball grid array (BGA) may be increased, thereby causing an increase in the size of an integrated circuit (IC). However, according to some embodiments of the present disclosure, one of the minor axis or the major axis may be formed in the direct loop structure, and the other thereof may be formed in the cap-assisted loop structure. Accordingly, the increase in the IC size of the sensor driving unit 200C may be minimized or reduced. In other words, the electronic device 1000 (e.g., refer to FIG. 1A) having an improved space efficiency may be provided.

Referring to FIGS. 12, 18, and 20, in the sensing mode of the second mode MD2, the first sensing signal PRX1 and the second sensing signal PRX2 may be utilized to sense coordinates of the pen PN.

During the second mode MD2-d, the sensor layer 200 may be scanned and driven to detect the second input 3000. In the sensing mode of the second mode MD2-d, the sensor driving unit 200C may utilize only the second sensing signal PRX2 to focus on the detection of the pen PN.

According to some embodiments of the present disclosure, in the second mode MD2-d, the first sensing signal PRX1 may not be used to detect the pen PN, and only the second sensing signal PRX2 may be used to detect the pen PN. In other words, an amount of calculation of the sensor driving unit 200C may be relatively decreased. Accordingly, the electronic device 1000 (e.g., refer to FIG. 1A) having a power consumption that is reduced may be provided.

According to some embodiments of the present disclosure, because the intensity of the second sensing signal PRX2 may be higher than the intensity of the first sensing signal PRX1, it may be easier to determine whether or not the second sensing signal PRX2 generated by the pen PN is transmitted to the sensor driving unit 200C. Even when the pen PN is hovering, the sensor driving unit 200C may more easily detect the second sensing signal PRX2. Accordingly, the electronic device 1000 (e.g., refer to FIG. 1A) having an improved sensing reliability may be provided.

When the pen PN is detected by the second sensing signal PRX2, the sensor driving unit 200C may operate in the third operation mode DMD3.

Figure 22:
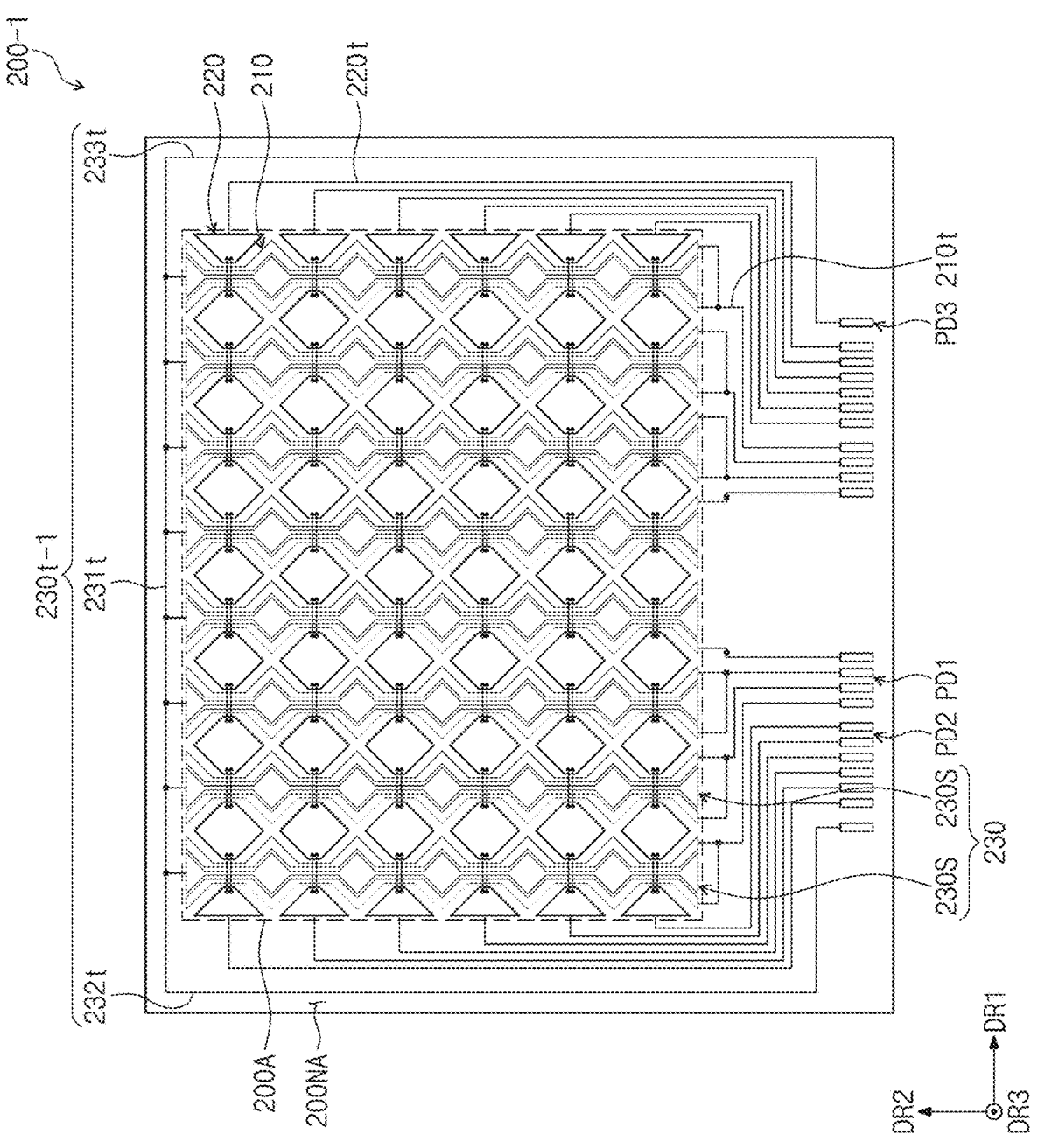
FIG. 22 is a plan view illustrating a sensor layer according to an embodiment of the present disclosure.

FIG. 22 is a plan view illustrating a sensor layer according to an embodiment of the present disclosure. In FIG. 22, the components that are the same or substantially the same as (or similar to) those described above with reference to FIG. 7 are denoted by the same reference numerals/signs, and thus, redundant description thereof may not be repeated.

Referring to FIG. 22, a sensor layer 200-1 may further include a charging trace line 230t-1 and the plurality of third pads PD3 disposed in the peripheral area 200NA.

The charging trace line 230t-1 may include a first line portion 231t extending in the first direction DR1 and electrically connected to the auxiliary electrodes 230, a second line portion 232t extending from a first end of the first line portion 231t in the second direction DR2, and a third line portion 233t extending from a second end of the first line portion 231t in the second direction DR2.

For example, the charging trace line 230t-1 illustrated in FIG. 22 may be defined as a trace line in which the (3-2)-th trace line 230rt2 is excluded from the charging trace line 230t described above with reference to FIG. 7.

Figure 23:
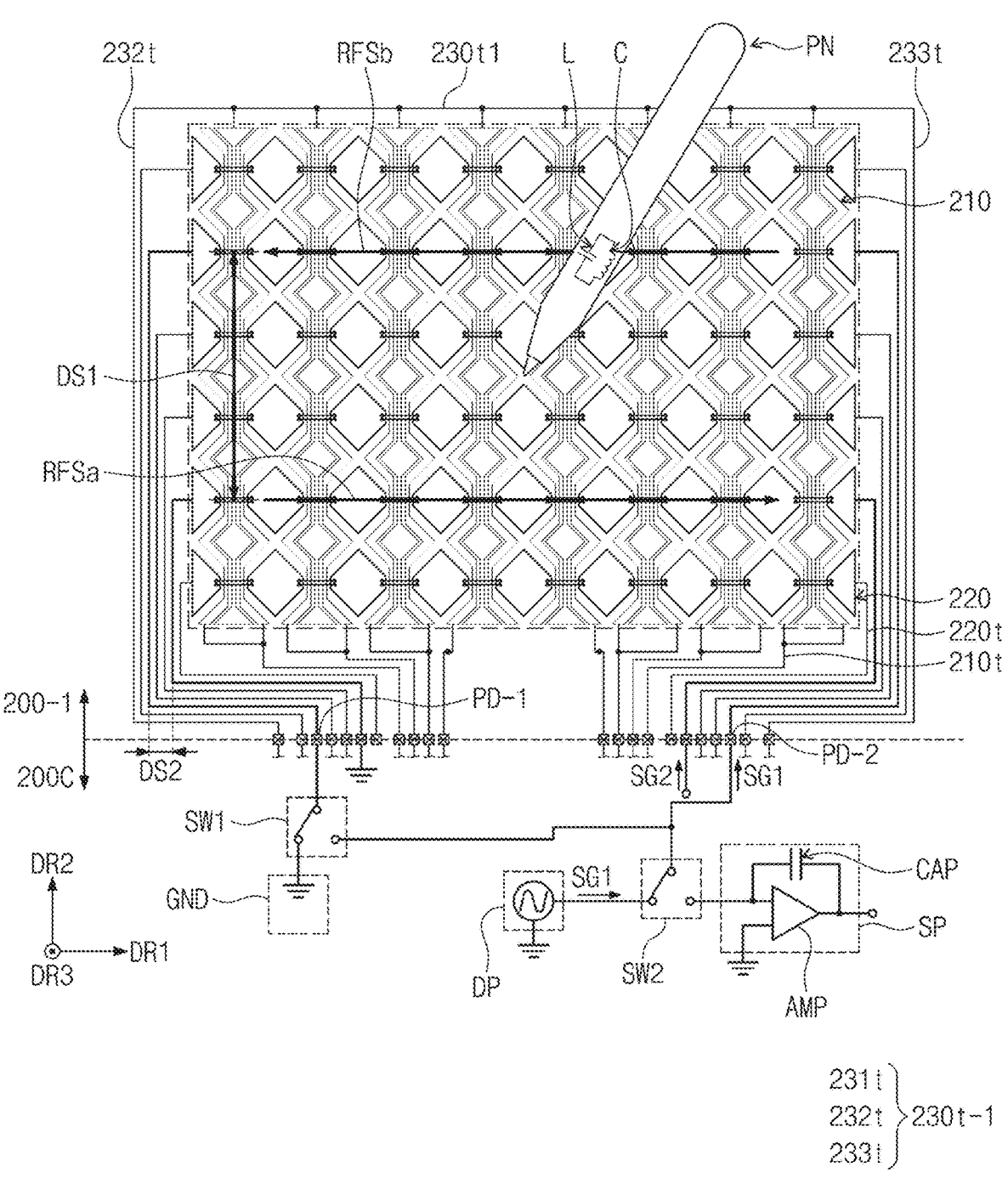
FIG. 23 illustrates a second mode of a sensor layer and a sensor driving unit according to an embodiment of the present disclosure.

FIG. 23 illustrates a second mode of a sensor layer and a sensor driving unit according to an embodiment of the present disclosure. In FIG. 23, the components that are the same or substantially the same as (or similar to) those described above with reference to FIG. 15 are denoted by the same reference numerals/signs, and thus, redundant description thereof may not be repeated.

Referring to FIGS. 22 and 23, in the charging mode, the sensor driving unit 200C may transmit the charging signals SG1 and SG2 to the sensor layer 200-1.

Second pad parts from among the plurality of pad parts may be respectively connected to the plurality of second pads PD2. A second pad connected to a first end of each of the plurality of second electrodes 220 from among the plurality of second pads PD2 may be connected to the (2-1)-th pad part PD-1. A second pad connected to a second end of each of the plurality of second electrodes 220 from among the plurality of second pads PD2 may be connected to the (2-2)-th pad part PD-2.

In the charging mode, the first switch SW1 connected to the (2-1)-th pad part PD-1 of the sensor driving unit 200C may be connected to the ground GND. The second switch SW2 connected to the (2-2)-th pad part PD-2 may be connected to the driving unit DP.

The driving unit DP may generate the charging signals SG1 and SG2. The charging signals SG1 and SG2 may include the first charging signal SG1 and the second charging signal SG2. A phase of the second charging signal SG2 may be opposite to a phase of the first charging signal SG1.

The sensor driving unit 200C may transmit the first charging signal SG1 to one second electrode from among the plurality of second electrodes 220, and may transmit the second charging signal SG2 to another second electrode from among the plurality of second electrodes 220.

The second electrode 220-1 and the second electrode 220-2 may be spaced apart from each other, with at least one of the others of the plurality of second electrodes 220 interposed therebetween. A shape where the second electrode 220-1 and the second electrode 220-2 are spaced apart from each other with two second electrodes 220 interposed therebetween is illustrated in FIG. 23 as an example. However, the present disclosure is not limited thereto. According to an embodiment of the present disclosure, the number of second electrodes 220 disposed between the second electrode 220-1 and the second electrode 220-2 is not limited thereto. The sensor driving unit 200C may control the size of the charging loop by adjusting the number of second electrodes 220 to be disposed between the second electrode 220-1 and the second electrode 220-2.

A first current RFSa may flow on the second electrode 220-1 by the second charging signal SG2.

A second current RFSb may flow on the second electrode 220-2 by the first charging signal SG1.

The current path of the first current RFSa and the current path of the second current RFSb may be in the shape of a coil. Accordingly, in the charging mode, the resonant circuit of the pen PN may be charged by the current path. The current path of the first current RFSa may be referred to as an "inner loop", and the current path of the second current RFSb may be referred to as an "outer loop".

In the charging mode, a first distance DS1 between the second electrode 220-1 and the second electrode 220-2 in the second direction DR2 may be greater than a second distance DS2 between one trace line connected to the second electrode 220-1 from among the plurality of second trace lines 220t and another trace line connected to the second electrode 220-2 from among the plurality of second trace lines 220t in the first direction DR1. For example, the first distance DS1 may be 4 mm (millimeter) to 20 mm. The second distance DS2 may be 100 um (micrometer) to 900 um.

According to some embodiments of the present disclosure, the sensor driving unit 200C may more easily drive the sensor layer 200 by using the first switch SW1 and the second switch SW2, depending on a mode. Accordingly, the electronic device 1000 having an improved reliability may be provided.

When the first charging signal SG1 and the second charging signal SG2 have an opposite-phase relationship with each other, the noise caused by the first charging signal SG1 in the display layer 100 may be canceled out with the noise caused by the second charging signal SG2. Accordingly, a flicker phenomenon may not occur in the display layer 100. Accordingly, the display quality of the display layer 100 may be improved.

Figure 24:
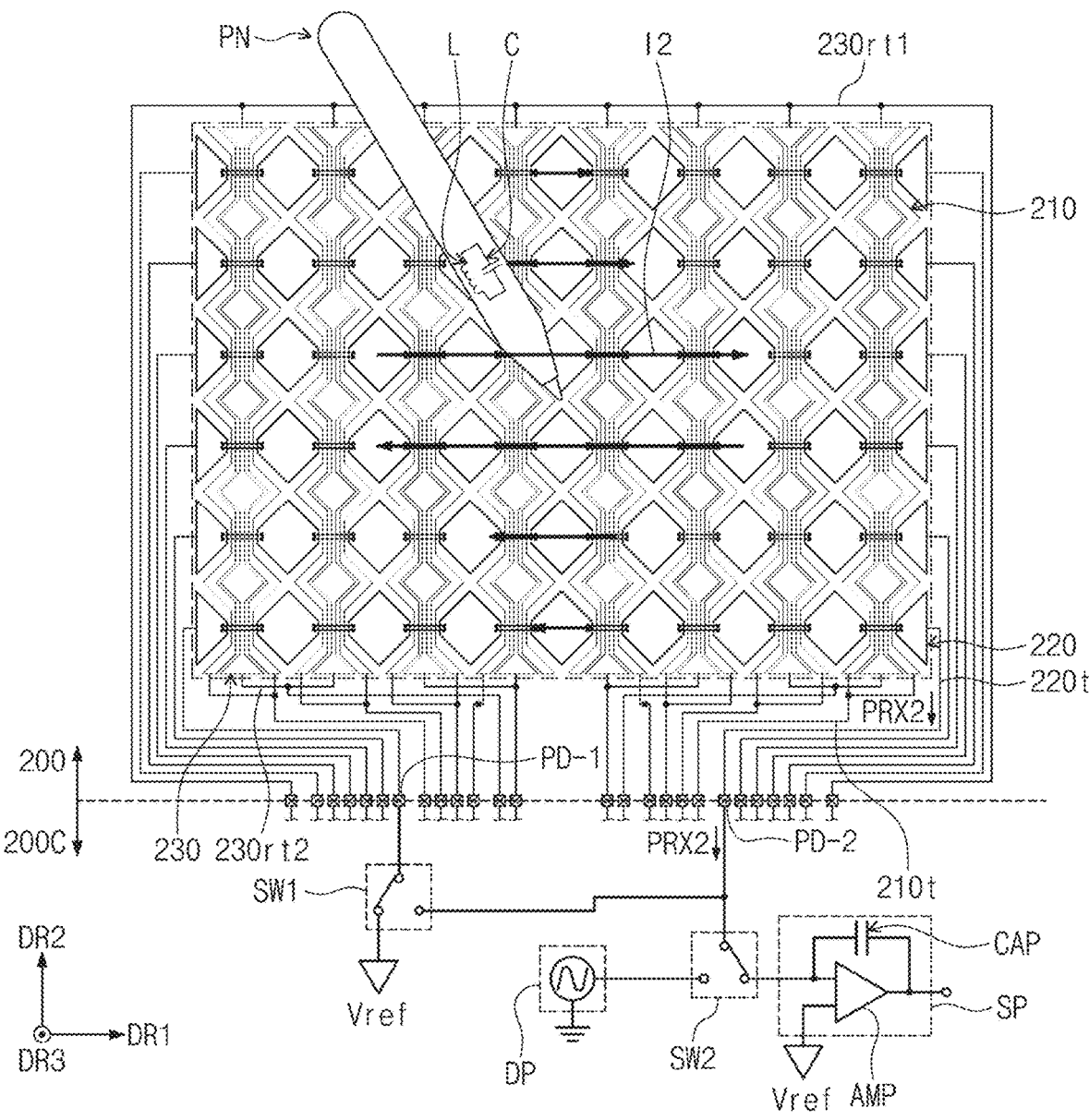
FIG. 24 illustrates a second mode of a sensor layer and a sensor driving unit according to an embodiment of the present disclosure.

FIG. 24 illustrates a second mode of a sensor layer and a sensor driving unit according to an embodiment of the present disclosure. In FIG. 24, the components that are the same or substantially the same as (or similar to) those described above with reference to FIG. 20 are denoted by the same reference numerals/signs, and thus, redundant description thereof may not be repeated.

Referring to FIG. 24, in the sensing mode of each of the second mode MD2-d and the second mode MD2, the first switch SW1 may connect the (2-1)-th pad part PD-1 and the voltage providing unit to each other. For example, the first switch SW1 may be connected to provide a reference voltage Vref to the (2-1)-th pad part PD-1. The reference voltage Vref may have a suitable voltage level (e.g., a given or predetermined voltage level).

The second switch SW2 may be connected to the (2-2)-th pad part PD-2 and the sensing unit SP.

The reference voltage Vref may be provide to the second input terminal of the amplifier AMP. The second input terminal of the amplifier AMP and the first switch SW1 may have the same or substantially the same voltage level as each other.

Figure 25:
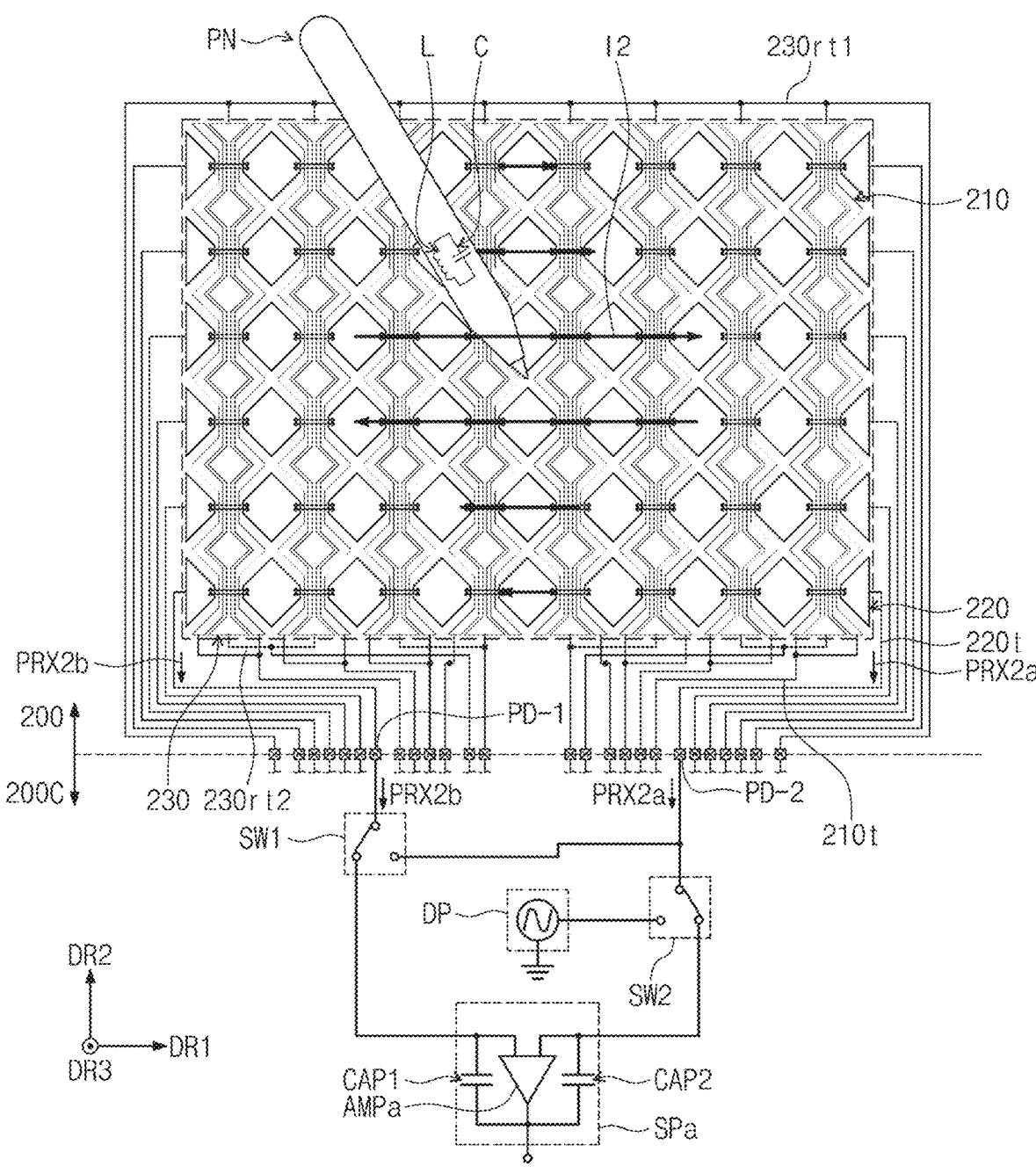
FIG. 25 illustrates a second mode of a sensor layer and a sensor driving unit according to an embodiment of the present disclosure.

FIG. 25 illustrates a second mode of a sensor layer and a sensor driving unit according to an embodiment of the present disclosure. In FIG. 25, the components that are the same or substantially the same as (or similar to) those described above with reference to FIG. 20 are denoted by the same reference numerals/signs, and thus, redundant description thereof may not be repeated.

Referring to FIG. 25, the second induced currents 12 formed on the plurality of second electrodes 220 may be transferred to the sensor driving unit 200C. The sensor driving unit 200C may receive second sensing signals PRX2a and PRX2b, which are based on the second induced current 12. The second sensing signals PRX2a and PRX2b may include a (2-1)-th sensing signal PRX2a and a (2-2)-th sensing signal PRX2b.

The (2-1)-th sensing signal PRX2a may be output through a first end of each of the plurality of first electrodes 210, and the ((2-2)-th second sensing signal PRX2b may be output through a second end of each of the plurality of first electrodes 210, which is spaced apart from the first end in the first direction DR1.

The sensor driving unit 200C may include a plurality of sensing units (e.g., a plurality of sensors or a plurality of sensing circuits) SPa. Each of the plurality of sensing units SPa may include the amplifier AMPa and the plurality of capacitors CAP1 and CAP2. The first input terminal of the amplifier AMPa may be connected to the (2-1)-th pad part PD-1. The second input terminal of the amplifier AMPa may be connected to the (2-2)-th pad part PD-2. A signal output through the output terminal of the amplifier AMPa may be filtered. Afterwards, the filtered signal may be converted into a digital signal.

The first capacitor CAP1 may be connected between the first input terminal and the output terminal. The second capacitor CAP2 may be connected between the second input terminal and the output terminal.

The (2-1)-th sensing signal PRX2a may be provided to the first input terminal of the amplifier AMPa. The (2-2)-th sensing signal PRX2b may be provided to the second input terminal of the amplifier AMPa.

Each of the plurality of sensing units SPa may receive the (2-1)-th sensing signal PRX2a and the (2-2)-th sensing signal PRX2b, and may amplify a difference between the (2-1)-th sensing signal PRX2a and the (2-2)-th sensing signal PRX2b.

The sensor driving unit 200C may detect coordinates of the pen PN based on the first sensing signal PRX1 (e.g., refer to FIG. 18) and/or the second sensing signals PRX2a and PRX2b.

According to some embodiments described above, because a plurality of second electrodes may have a direct loop structure, and a sensor driving unit may directly receive a second sensing signal from each of the plurality of second electrodes, the intensity of the second sensing signal may be greater than the intensity of a first sensing signal, which is based on the capacitive coupling and is received from a plurality of first electrodes with a cap-assisted loop structure. Compared to the case where all sensing electrodes of a sensor layer are implemented in the cap-assisted loop structure, the pen sensing-bandwidth of the sensor layer may be improved. Accordingly, an electronic device having an improved pen sensing reliability may be provided.

According to some embodiments described above, one of the minor axis or the major axis may be formed in the direct loop structure, and the other thereof may be formed in the cap-assisted loop structure. Accordingly, the increase in the IC size of the sensor driving unit may be minimized or reduced. As such, an electronic device having an improved space efficiency may be provided.

The electronic or electric devices and/or any other relevant devices or components according to embodiments of the present disclosure described herein may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the example embodiments of the present disclosure.

The foregoing is illustrative of some embodiments of the present disclosure, and is not to be construed as limiting thereof. Although some embodiments have been described, those skilled in the art will readily appreciate that various modifications are possible in the embodiments without departing from the spirit and scope of the present disclosure. It will be understood that descriptions of features or aspects within each embodiment should typically be considered as available for other similar features or aspects in other embodiments, unless otherwise described. Thus, as would be apparent to one of ordinary skill in the art, features, characteristics, and/or elements described in connection with a particular embodiment may be used singly or in combination with features, characteristics, and/or elements described in connection with other embodiments unless otherwise specifically indicated. Therefore, it is to be understood that the foregoing is illustrative of various example embodiments and is not to be construed as limited to the specific embodiments disclosed herein, and that various modifications to the disclosed embodiments, as well as other example embodiments, are intended to be included within the spirit and scope of the present disclosure as defined in the appended claims, and their equivalents.

What is claimed is:

1. An electronic device comprising:
a display layer;
a sensor layer on the display layer; and
a sensor driver configured to drive the sensor layer,
wherein the sensor layer comprises:
a plurality of first electrodes, each extending in a first direction; and
a plurality of second electrodes, each extending in a second direction crossing the first direction,
wherein the sensor driver is configured to selectively operate in a first mode for sensing a touch and in a second mode for sensing an external input device,
wherein the second mode comprises a charging mode and a sensing mode,
wherein, in the first mode, the sensor driver is configured to electrically connect a first end and a second end at opposite sides of the sensor layer to each other of each of the plurality of second electrodes, and transmit a driving signal to each of the first and second ends of the plurality of second electrodes, and
wherein, in the sensing mode, the sensor driver is configured to receive a first sensing signal through the second end.

2. The electronic device of claim 1, further comprising a plurality of auxiliary electrodes, each extending in the first direction, and insulated from the plurality of second electrodes,
wherein each of the plurality of auxiliary electrodes comprises at least one pattern electrode, and
wherein, in a plan view, each of the plurality of first electrodes surrounds the pattern electrode of a corresponding one of the plurality of auxiliary electrodes.

3. The electronic device of claim 1, wherein an area of each of the plurality of first electrodes is smaller than an area of each of the plurality of second electrodes.

4. The electronic device of claim 1, wherein, in a plan view, a length of each of the plurality of first electrodes in the first direction is smaller than a length of each of the plurality of second electrodes in the second direction.

5. The electronic device of claim 2, wherein the plurality of auxiliary electrodes are electrically connected to each other.

6. The electronic device of claim 2, wherein the sensor driver is configured to directly receive a current of the first sensing signal in the sensing mode, and
wherein the sensor driver is configured to receive a second sensing signal transferred by a capacitive coupling between the plurality of first electrodes and the plurality of auxiliary electrodes in the sensing mode.

7. The electronic device of claim 6, wherein an intensity of the first sensing signal is greater than an intensity of the second sensing signal.

8. An electronic device comprising:

a display layer;

a sensor layer on the display layer; and a sensor driver configured to drive the sensor layer, wherein the sensor layer comprises:

a plurality of first electrodes, each extending in a first direction; and a plurality of second electrodes, each extending in a second direction crossing the first direction, wherein the sensor driver is configured to selectively operate in a first mode for sensing a touch and in a second mode for sensing an external input device, wherein the second mode comprises a charging mode and a sensing mode, wherein, in the first mode, the sensor driver is configured to electrically connect a first end and a second end to each other of each of the plurality of second electrodes, and transmit a driving signal to each of the plurality of second electrodes, wherein, in the sensing mode, the sensor driver is configured to receive a first sensing signal through the second end, and wherein the sensor driver comprises:

a driver configured to generate the driving signal and a charging signal;

a sensing circuit comprising an analog front-end;

a voltage providing circuit configured to provide a voltage with a voltage level;

a first pad part electrically connected to the first end;

a second pad part electrically connected to the second end;

a first switch connected to the first pad part, and configured to switch between the voltage providing circuit and the second pad part; and a second switch connected to the second pad part, and configured to switch between the driver and the sensing circuit.

9. The electronic device of claim 8, wherein the sensing circuit is configured to operate in a single-ended mode.

10. The electronic device of claim 8, wherein the sensing circuit is configured to operate in a differential mode.

11. The electronic device of claim 8, wherein, in the first mode, the first switch is configured to be connected to the first pad part and the second pad part, and the second switch is configured to be connected to the second pad part and the driver.

12. The electronic device of claim 8, further comprising a plurality of auxiliary electrodes, each extending in the first direction, and insulated from the plurality of second electrodes, wherein, in the charging mode, the sensor driver is configured to transmit a first charging signal to one of the plurality of auxiliary electrodes, and transmit a second charging signal to another of the plurality of auxiliary electrodes.

13. The electronic device of claim 12, wherein a phase of the first charging signal is opposite to a phase of the second charging signal.

14. The electronic device of claim 12, wherein, during the charging mode, the plurality of second electrodes are configured to be floated.

15. The electronic device of claim 12, wherein the one of the plurality of auxiliary electrodes and the another of the plurality of auxiliary electrodes are spaced from each other with at least one of others of the plurality of auxiliary electrodes located therebetween.

16. The electronic device of claim 12, wherein, in the charging mode, the first switch is configured to be connected to the first pad part and the voltage providing circuit, the second switch is configured to be connected to the second pad part and the driver, a first charging signal is configured to be transmitted to one of the plurality of second electrodes, and a second charging signal is configured to be transmitted to another of the plurality of second electrodes.

17. The electronic device of claim 16, wherein a phase of the first charging signal is opposite to a phase of the second charging signal.

18. The electronic device of claim 16, wherein the one of the plurality of second electrodes and the another of the plurality of second electrodes are spaced from each other with at least one of others of the plurality of second electrodes located therebetween.

19. The electronic device of claim 18, wherein the sensor layer comprises an active area, and a peripheral area adjacent to the active area, wherein the plurality of first electrodes, the plurality of second electrodes, and the plurality of auxiliary electrodes are located in the active area, and wherein the sensor layer further comprises a plurality of sensing lines located in the peripheral area, and connected to the plurality of second electrodes, respectively.

20. The electronic device of claim 19, wherein, in the charging mode, a first distance between the one of the plurality of second electrodes and the another of the plurality of second electrodes in a first direction is greater than a second distance between one of the plurality of sensing lines connected to the one of the plurality of second electrodes and another of the plurality of sensing lines connected to the another of the plurality of second electrodes, in a second direction crossing the first direction.

21. An electronic device comprising:

a display layer;

a sensor layer on the display layer; and a sensor driver configured to drive the sensor layer, wherein the sensor layer comprises:

a plurality of first electrodes, each extending in a first direction;

a plurality of second electrodes, each extending in a second direction crossing the first direction; and a plurality of auxiliary electrodes, each extending in the first direction, and insulated from the plurality of second electrodes, wherein the sensor driver is configured to operate in a charging mode or a sensing mode wherein, in the charging mode, the sensor driver is configured to transmit a first charging signal to one of the plurality of auxiliary electrodes, and transmit a second charging signal to another of the plurality of auxiliary electrodes, wherein, in the sensing mode, the sensor driver is configured to directly receive a current of a first sensing signal from the plurality of second electrodes, and the sensor driver is configured to receive a second sensing signal transferred by a capacitive coupling between the plurality of first electrodes and the plurality of auxiliary electrodes.

22. The electronic device of claim 21, wherein each of the plurality of auxiliary electrodes comprises at least one pattern electrode, and wherein, in a plan view, each of the plurality of first electrodes surrounds the pattern electrode of a corresponding one of the plurality of auxiliary electrodes.

23. The electronic device of claim 21, wherein an area of each of the plurality of first electrodes is smaller than an area of each of the plurality of second electrodes.

24. The electronic device of claim 21, wherein, in a plan view, a length of each of the plurality of first electrodes in the first direction is smaller than a length of each of the plurality of second electrodes in the second direction.

25. The electronic device of claim 21, wherein the plurality of auxiliary electrodes are electrically connected to each other.

26. The electronic device of claim 21, wherein an intensity of the first sensing signal is greater than an intensity of the second sensing signal.

27. The electronic device of claim 21, wherein a phase of the first charging signal is opposite to a phase of the second charging signal.

28. The electronic device of claim 20, wherein, during the charging mode, the plurality of second electrodes are configured to be floated.

\* \* \* \* \*